(12) United States Patent
Tanaka et al.

(10) Patent No.: US 7,136,263 B2
(45) Date of Patent: Nov. 14, 2006

(54) THIN-FILM MAGNETIC HEAD, THIN-FILM MAGNETIC HEAD ASSEMBLY, STORAGE DEVICE, AND METHOD OF MANUFACTURING THIN-FILM MAGNETIC HEAD

(75) Inventors: Kosuke Tanaka, Chuo-ku (JP); Koji Shimazawa, Chuo-ku (JP); Koichi Terunuma, Chuo-ku (JP)

(73) Assignee: TDK Corporation, Tokyo (JP)

( * ) Notice: Subject to any disclaimer, the term of this patent is extended or adjusted under 35 U.S.C. 154(b) by 409 days.

(21) Appl. No.: 10/727,551

(22) Filed: Dec. 5, 2003

(65) Prior Publication Data

US 2004/0125513 A1  Jul. 1, 2004

(30) Foreign Application Priority Data

Dec. 26, 2002  (JP) .............................. 2002-377674

(51) Int. Cl.
*G11B 5/127* (2006.01)
(52) U.S. Cl. ....................................... 360/317
(58) Field of Classification Search ..................... None
See application file for complete search history.

(56) References Cited

U.S. PATENT DOCUMENTS

| | | | | |
|---|---|---|---|---|
| 5,214,840 A | * | 6/1993 | Imagawa et al. | 29/603.08 |
| 6,724,581 B1 | * | 4/2004 | Westwood | 360/317 |
| 2002/0135947 A1 | | 9/2002 | Aoki et al. | |

FOREIGN PATENT DOCUMENTS

| | | |
|---|---|---|
| JP | 08-138213 A | 5/1996 |
| JP | A 08-138213 | 5/1996 |
| JP | A 11-25431 | 1/1999 |
| JP | 2002-280643 A | 9/2002 |
| JP | 2002-280644 A | 9/2002 |
| JP | A 2002-280643 | 9/2002 |
| JP | A 2002-280644 | 9/2002 |

* cited by examiner

Primary Examiner—Allen Cao
(74) Attorney, Agent, or Firm—Oliff & Berridge, PLC

(57) ABSTRACT

A thin-film magnetic head comprises a magnetoresistive film, a pair of magnetic domain control layers for applying a bias magnetic field to the magnetoresistive film, a pair of electrode layers for supplying a current to the magnetoresistive film, first and second shield layers for shielding the magnetoresistive film, a first insulating layer disposed between the magnetoresistive film and magnetic domain control layer and the first shield layer, and a second insulating layer disposed between the magnetoresistive film and electrode layer and the second shield layer. The shield layers have a distance therebetween shorter at a position where the electrode layer and magnetic domain control layer are laminated than that at a position where the magnetoresistive film is located. While the surface of the magnetic domain control layer on the first insulating layer side at the position where the electrode film and magnetic domain control layer are laminated is taken as a reference surface, the distance from the reference surface to the surface of the electrode layer on the second insulating layer side is set shorter than the distance from the reference surface to the surface of the magnetoresistive film on the second insulating layer side.

7 Claims, 24 Drawing Sheets

THIN-FILM MAGNETIC HEAD, THIN-FILM MAGNETIC HEAD ASSEMBLY, STORAGE DEVICE, AND METHOD OF MANUFACTURING THIN-FILM MAGNETIC HEAD

BACKGROUND OF THE INVENTION

1. Field of the Invention

The present invention relates to a thin-film magnetic head, a thin-film magnetic head assembly, a storage device, and a method of manufacturing a thin-film magnetic head.

2. Related Background Art

Known as this kind of thin-film magnetic head is one comprising a magnetoresistive film, a pair of electrodes for supplying a current to the magnetoresistive film, and a permanent magnet film for applying a longitudinal bias magnetic field to the magnetoresistive film. The magnetoresistive film is disposed between a pair of magnetic shield films. The distance between the magnetic shield films at a position where the electrodes are provided is not wider than the distance of the magnetic shield films at a position where the magnetoresistive film is provided. This reduces the magnetic field applied to the magnetoresistive film at both end parts thereof in the track width direction. As a result, the seepage of read sensitivity is lowered, so as to stabilize the read output of the thin-film magnetic head.

SUMMARY OF THE INVENTION

It is an object of the present invention to provide a thin-film magnetic head which can further lower the seepage in reading at both end parts of the magnetoresistive film in a track width direction thereof and effectively restraining the effective track width from expanding, while being able to attain a very high output stability; and a thin-film magnetic head assembly and storage device equipped with the thin-film magnetic head.

It is another object of the present invention to provide a method of manufacturing a thin-film magnetic head which can suppress the thickness of magnetic domain control layers and electrode layers laminated on both sides of the magnetoresistive film.

The present invention provides a thin-film magnetic head comprising a magnetoresistive film; a pair of magnetic domain control layers, disposed separately from each other on both sides of the magnetoresistive film in a track width direction, for applying a bias magnetic field to the magnetoresistive film; a pair of electrode layers, laminated on the respective magnetic domain control layers while being separated from each other on both sides of the magnetoresistive film in the track width direction, for supplying a current to the magnetoresistive film; first and second shield layers, disposed separately from each other in a laminating direction so as to hold the magnetic domain control layers and electrode layers therebetween, for shielding the magnetoresistive film; a first insulating layer disposed between the magnetoresistive film and magnetic domain control layer and the first shield layer; and a second insulating layer disposed between the magnetoresistive film and electrode layer and the second shield layer; wherein the shield layers have a distance therebetween shorter at a position where the electrode layer and magnetic domain control layer are laminated than that at a position where the magnetoresistive film is located; and wherein, while a surface of the magnetic domain control layer on the first insulating layer side at the position where the electrode film and magnetic domain control layer are laminated is taken as a reference surface, a distance from the reference surface to a surface of the electrode layer on the second insulating layer side is set shorter than the distance from the reference surface to a surface of the magnetoresistive film on the second insulating layer side.

In the thin-film magnetic head in accordance with the present invention, while the surface of the magnetic domain control layer on the first insulating layer side at a position where the electrode layer and magnetic domain control layer are laminated is taken as a reference surface, the distance from the reference surface to the surface of the electrode layer on the second insulating layer side is set shorter than the distance from the reference surface to the surface of the magnetoresistive film on the second insulating layer side, whereby the distance between the shield layers at the position where the electrode layer and magnetic domain control layer are laminated can be made further shorter than that at the position where the magnetoresistive film is located. This further reduces the seepage in reading at both end parts of the magnetoresistive film in the track width direction thereof. As a result, the effective track width can effectively be restrained from expanding, and a very high output stability can be obtained.

Preferably, the thin-film magnetic head in accordance with the present invention further comprises an additional electrode layer separated from an end part of the magnetoresistive film in the track width direction by at least a predetermined length in the track width direction and electrically connected to the former electrode layer.

Such a configuration can lower the resistance of the electrode layers (including the additional electrode layer), thereby enhancing the read output.

Preferably, in the thin-film magnetic head in accordance with the present invention, the additional electrode layer has a thickness set greater than that of the former electrode layer.

Such a configuration can further lower the resistance of the electrode layers (including the additional electrode layer).

Preferably, the thin-film magnetic head in accordance with the present invention further comprises an additional magnetic domain control layer separated from an end part of the magnetoresistive film in the track width direction by at least a predetermined length in the track width direction and laminated on the former magnetic domain control layer.

Such a configuration can stabilize the longitudinal bias magnetic field, thereby further enhancing the output stability.

Preferably, in the thin-film magnetic head in accordance with the present invention, the distance from the reference surface to the surface of the electrode layer on the second insulating layer side is set shorter than the distance from the reference surface to the surface of the magnetoresistive film on the second insulating layer side within an area separated by 50 nm to 200 nm from an end part of the surface of the magnetoresistive film on the second insulating layer side in the track width direction.

Such a configuration can further effectively restrain the effective track width from expanding.

The present invention provides a thin-film magnetic head assembly comprising the above-mentioned thin-film magnetic head and a flexible member for attaching the thin-film magnetic head thereto.

Since the thin-film magnetic head assembly in accordance with the present invention comprises the above-mentioned thin-film magnetic head as its thin-film magnetic head, the seepage in reading at both end parts of the magnetoresistive film in the track width direction can further be reduced. As a consequence, the effective track width can effectively be restrained from expanding, and a very high output stability can be obtained.

The present invention provides a storage device comprising a magnetic recording medium for magnetically recording a signal; and the above-mentioned thin-film magnetic head for converting a change in a magnetic field leaking from the magnetic recording medium into an electric signal.

Since the storage device in accordance with the present invention comprises the above-mentioned thin-film magnetic head as its thin-film magnetic head, the seepage in reading at both end parts of the magnetoresistive film in the track width direction is further reduced as mentioned above. As a result, the effective track width can effectively be restrained from expanding, and a very high output stability can be obtained.

In one aspect, the present invention provides a method of manufacturing a thin-film magnetic head comprising a magnetoresistive film, a magnetic domain control layer for applying a bias magnetic field to the magnetoresistive film, and an electrode layer for supplying a current to the magnetoresistive film; the method comprising the steps of forming on the magnetoresistive film a first resist layer having a desirable pattern; removing the magnetoresistive film while using the first resist layer as a mask; successively forming the magnetic domain control layer and a first electrode layer on each of both sides of the magnetoresistive film while using the first resist layer as a mask; removing the first resist layer; forming on the magnetoresistive film a second resist layer having a desirable pattern wider than the first resist layer; forming a second electrode layer on the first electrode layer while using the second resist layer as a mask; and removing the second resist layer.

In the method of manufacturing a thin-film magnetic head in accordance with this aspect of the present invention, the second electrode layer is formed on the first electrode layer while using the second resist layer having a desirable pattern wider than the first resist layer as a mask, whereby the second electrode layer is separated from an end part of the magnetoresistive film in the track width direction by a length corresponding to the size of the second resist layer in the track width direction. As a result, a configuration in which the thickness of the magnetic domain control layer and electrode layer (first electrode layer) laminated on each side of the magnetoresistive film can be suppressed can easily be obtained.

In another aspect, the present invention provides a method of manufacturing a thin-film magnetic head comprising a magnetoresistive film, a magnetic domain control layer for applying a bias magnetic field to the magnetoresistive film, and an electrode layer for supplying a current to the magnetoresistive film; the method comprising the steps of forming on the magnetoresistive film a resist layer having a desirable pattern; removing the magnetoresistive film while using the resist layer as a mask; successively forming the magnetic domain control layer and a first electrode layer on each of both sides of the magnetoresistive film by successively depositing respective material substances constituting the magnetic domain control layer and electrode film at a predetermined first angle; forming a second electrode layer on the first electrode layer by depositing a material substance constituting the electrode layer at a predetermined second angle greater than the predetermined first angle while using the resist layer as a mask; and removing the resist layer.

In the method of manufacturing a thin-film magnetic head in accordance with this aspect of the present invention, while using the resist layer as a mask, the second electrode layer is formed on the first electrode layer by depositing a material substrate constituting the electrode layer at the predetermined second angle greater than the first predetermined angle for depositing a material substance constituting the electrode layer for forming the first electrode layer, whereby the second electrode layer is separated from an end part of the magnetoresistive film in the track width direction by a length corresponding to the predetermined second angle in the track width direction. As a result, a configuration which can suppress the thickness of the magnetic domain control layer and electrode layer (first electrode layer) laminated on each side of the magnetoresistive film can easily be obtained.

In still another aspect, the present invention provides a method of manufacturing a thin-film magnetic head comprising a magnetoresistive film, a magnetic domain control layer for applying a bias magnetic field to the magnetoresistive film, and an electrode layer for supplying a current to the magnetoresistive film; the method comprising the steps of forming on the magnetoresistive film a first resist layer having a desirable pattern; removing the magnetoresistive film while using the first resist layer as a mask; successively forming a first magnetic domain control layer and a first electrode layer on each of both sides of the magnetoresistive film while using the first resist layer as a mask; removing the first resist layer; forming on the magnetoresistive film a second resist layer having a desirable pattern wider than the first resist layer; removing the first electrode layer so as to expose the first magnetic domain control layer while using the second resist layer as a mask; forming a second magnetic domain control layer on the exposed first magnetic domain control layer while using the second resist layer as a mask; forming a second electrode layer on the second magnetic domain control layer while using the second resist layer as a mask; and removing the second resist layer.

In the method of manufacturing a thin-film magnetic head in accordance with this aspect of the present invention, the second magnetic domain control layer and second electrode layer are successively formed on the first magnetic domain control layer while using the second resist layer having a desirable pattern wider than the first resist layer as a mask, whereby the second magnetic domain control layer and second electrode layer are separated from an end part of the magnetoresistive film in the track width direction by a length corresponding to the size of the second resist layer in the track width direction. As a result, a configuration which can suppress the thickness of the magnetic domain control layer (first magnetic domain control layer) and electrode layer (first electrode layer) laminated on each side of the magnetoresistive film can easily be obtained.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

FIG. 23 is a graph showing the relationship between the distance X from an end part of the surface of a magnetoresistive film on the upper gap layer side and the spread of effective track with;

DESCRIPTION OF THE PREFERRED EMBODIMENTS

In the following, preferred embodiments of the thin-film magnetic head, thin-film magnetic head assembly, storage device, and method of manufacturing a thin-film magnetic head in accordance with the present invention will be explained in detail with reference to the drawings. In the explanation, constituents identical to each other or those having functions identical to each other will be referred to with numerals or letters identical to each other without repeating their overlapping descriptions. FIGS. 1 to 22 do not show hatching for illustrating cross sections. Words "upper" and "lower" conform to those in FIGS. 1 to 22.

First Embodiment

Figure 1:
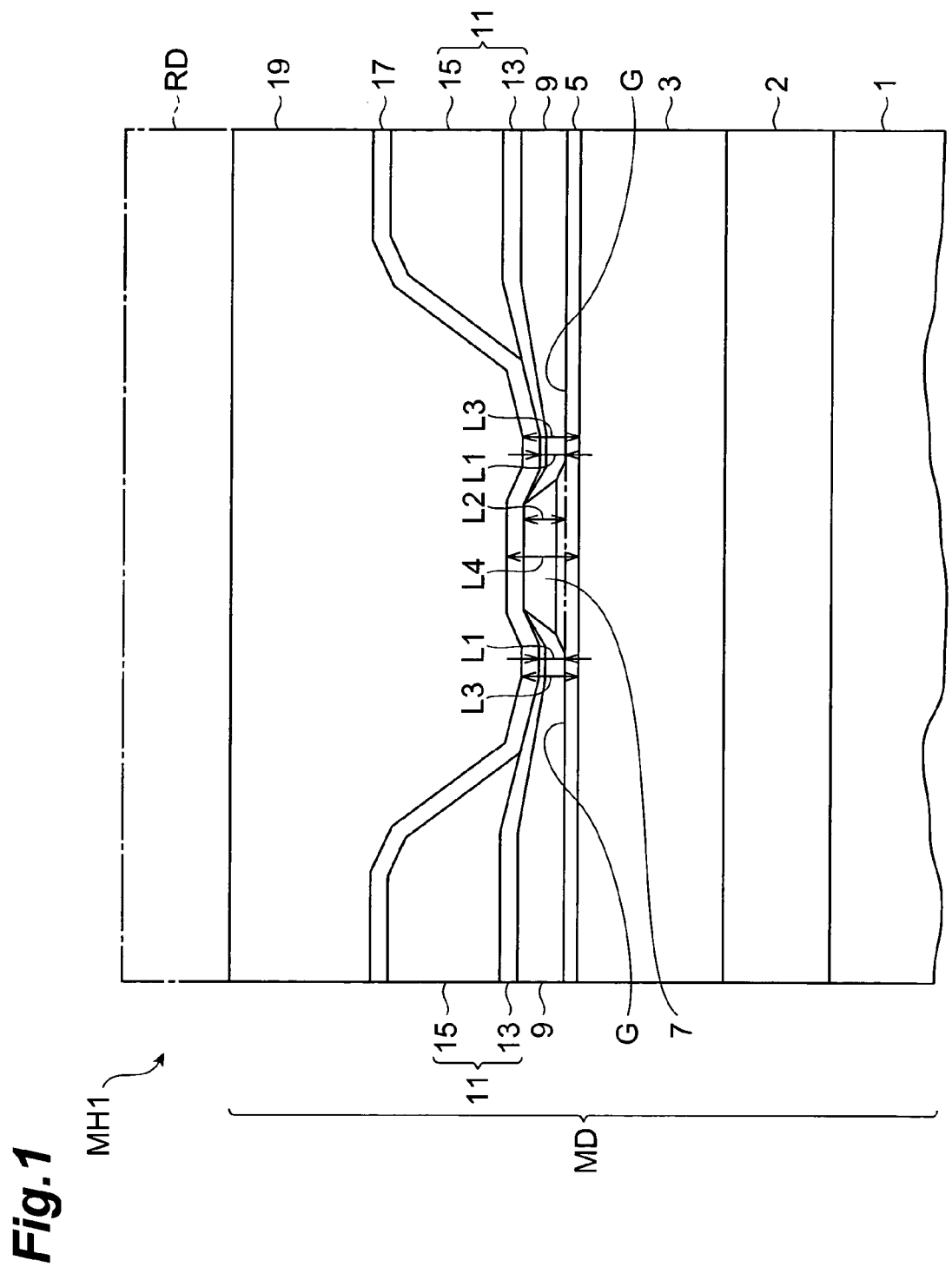
FIG. 1 is a schematic view for explaining the thin-film magnetic head in accordance with a first embodiment.

FIG. 1 is a schematic view for explaining a cross-sectional structure of a thin-film magnetic head MH1. The thin-film magnetic head MH1 comprises a magnetic detector MD as a read head, and a magnetic field forming device RD as a recording head. The magnetic detector MD comprises a nonmagnetic substrate 1, an undercoat layer 2, a lower magnetic shield layer 3 (first shield layer), a lower gap layer 5 (first insulating layer), a magnetoresistive (hereinafter referred to as "MR") film 7, magnetic domain control layers 9, electrode layers 11, an upper gap layer 17 (second insulating layer), and an upper magnetic shield layer 19 (second shield layer). FIG. 1 is a view showing the cross-sectional structure of the thin-film magnetic head MH1 as seen from the air bearing surface (a plane parallel to the laminating direction of layers in the MR film 7).

The nonmagnetic substrate 1 is made of $Al_2O_3$ TiC or the like. The undercoat layer 2 is made of $Al_2O_3$ or the like, and is formed on the nonmagnetic substrate 1. The thickness of the undercoat layer 2 is set to about 3 μm. The lower magnetic shield layer 3 is made of a soft magnetic material such as NiFe, Sendust, FeCo, and FeCoNi, and is formed on the undercoat layer 2. The thickness of the lower magnetic shield layer 3 is set within the range of 0.5 μm to 4 μm, e.g., at about 3 μm. The lower gap layer 5 is made of a nonmagnetic insulator such as $Al_2O_3$, AlN, and $SiO_2$, and is formed on the lower magnetic shield layer 3. The thickness of the lower gap layer 5 is set to 5 nm to 25 nm.

The MR film 7 is a GMR (Giant MagnetoResistive) film including a pinning layer (antiferromagnetic layer), a pinned layer (fixed magnetic layer), a nonmagnetic layer, and a free layer, which are not depicted. The MR film 7 is constructed by successively laminating an undercoat layer (not depicted), the pinning layer, the pinned layer, the nonmagnetic layer, the free layer, and a cap layer (not depicted) as thin films on the lower gap layer 5 and patterning them (for which techniques such as ion milling and RIE are usable). Exchange coupling occurs at the interface between the pinning layer and the pinned layer, whereby the direction of magnetization in the pinned layer is fixed to a predetermined direction (orthogonal to the track width direction). On the other hand, the direction of magnetization in the free layer varies depending on the leakage magnetic field from magnetic recording media, i.e., external magnetic field.

The pinning layer is made of an antiferromagnetic material such as PtMn and NiO, and is formed on the undercoat layer (mainly composed of Ta, Ni, Fe, Cr, or the like, for example) formed on the lower gap layer 5. The pinned layer is made of a ferromagnetic material such as Fe, Co, Ni, NiFe, CoFe, CoZrNb, and FeCoNi, and is formed on the pinning layer. The nonmagnetic layer is made of a nonmagnetic material such as Cu, Ru, Rh, Ir, Au, and Ag, and is formed on the pinned layer. The free layer is made of a ferromagnetic material such as Fe, Co, Ni, NiFe, CoFe, CoZrNb, and FeCoNi, and is formed on the nonmagnetic layer. A protective layer (not depicted), which is made of Ta, $Al_2O_3$, or the like, is formed on the MR film 7. The thickness of the MR film 7 is set to 15 nm to 45 nm.

A pair of magnetic domain control layers 9 are disposed while being separated from each other on both sides of the MR film 7 in the track width direction so as to hold the MR film 7 therebetween. The magnetic domain control layers 9 apply a longitudinal bias magnetic field to the MR film 7 (free layer). Because of the longitudinal bias magnetic field from the magnetic domain control layer 9, the direction of magnetization in the free layer is parallel to the track width direction. Each magnetic domain control layer 9 is a laminate film composed of an undercoat layer such as CrTi and TiW and a hard magnetic layer such as CoPt, CoCrPt, and CoTa, and has a high coercive force. The magnetic domain control layer 9 is provided on each of both flanks of the MR film 7 byway of a protective layer (not depicted). The protective layer is made of a metal material such as Ta, and is formed on a side of the MR film 7 and on the lower gap layer 5. The distance between the magnetic domain control layers 9 is set to 50 nm to 200 nm at its narrowest position. A protective layer (not depicted), which is made of Ta or the like, is formed on the magnetic domain control layers 9. Each magnetic domain control layer 9 may be a laminate film composed of a magnetic layer and an antiferromagnetic layer such as a NiFe/IrMn laminate film as well. The thickness of the magnetic domain control layer 9 is set to 15 nm to 50 nm. For the undercoat layer, not only CrTi and TiW, but also Cr, W, and FeCo, as well as substances including them which yield a body-centered cubic lattice can be used.

A pair of electrode layers 11 are disposed while being separated from each other at both sides of the MR film 7 in the track width direction thereof. The electrode layers 11 supply a current (sense current) to the MR film 7 (free layer). Each electrode layer 11 includes a first electrode layer 13 and a second electrode layer 15 which are electrically connected to each other. Electrons supplied from one electrode layer 11 (first electrode layer 13 and second electrode layer 15) are transmitted to the other electrode layer 11 (first electrode layer 13 and second electrode layer 15) through the free layer of the MR film 7. The current flows in a direction opposite from the flow of electrons. The distance between a pair of electrode layers 11 is set to 30 nm to 500 nm at its narrowest position. The electric resistance of the electrode layer 11 is set lower than that of the magnetic domain control layer 9.

Each first electrode layer 13 is made of a low-resistance electrically conductive material including Au, Ag, Ru, Rh, Cu, Cr, Mo, or the like, and is formed on the protective film formed on the respective magnetic domain control layer 9. A protective layer (not depicted), which is made of Ta or the like, is formed on the first electrode layer 13. The thickness of the first electrode layer 13 is set to 30 nm or less. The thickness may be set to 0 nm when the magnetic domain control layer 9 and protective layer are made of an electrically conductive material. The first electrode layer 13 and magnetic domain control layer 9 are laminated on each of both sides of the MR film 7 in the track width direction.

Each second electrode layer 15 is disposed while being separated from an end part of the MR film 7 in the track width direction by a predetermined length in the track width direction. The second electrode layer 15 is made of a low-resistance electrically conductive material including Au, Ag, Ru, Rh, Cu, Cr, Mo, or the like, and is formed on the protective layer formed on the first electrode layer 13. A protective layer (not depicted), which is made of Ta, $Al_2O_3$, or the like, is formed on the second electrode layer 15. In this embodiment, the predetermined length is set within the range of 10 nm to 200 nm, e.g., at about 100 nm. The thickness of the second electrode layer 15 is generally greater than that of the first electrode layer 13, and is set to 20 nm to 150 nm. It is not necessary for the first electrode layer 13 and second electrode layer 15 to be directly in contact with each other. An electrically conductive member or the like may be interposed between the electrode layers as long as they are in an electrically connected state.

The upper gap layer 17 is made of a nonmagnetic material such as $Al_2O_3$, AlN, and $SiO_2$. The upper gap layer 17 is formed on the protective layer formed on the MR film 7 and electrode layer 11 (first electrode layer 13 and second electrode layer 15); or on the protective layer formed on the MR film 7, magnetic domain control layer 9, and second electrode layer 15 if there is no first electrode layer 13. The thickness of the upper gap layer 17 is set to 5 nm to 25 nm.

The upper magnetic shield layer 19 is made of a soft magnetic material such as NiFe, Sendust, FeCo, and FeCoNi, and is formed on the upper gap layer 17. The thickness of the upper magnetic shield layer 19 is set within the range of 0.5 µm to 4 µm, e.g., at about 2 µm. Each of the shield layers 3, 19 is made of a soft magnetic material, and thus restrains leakage magnetic fields other than those from a magnetization transitional area to be detected from being introduced into the MR film 7.

In the thin-film magnetic head MH1, while the surface of each magnetic domain control layer 9 on the lower gap layer 5 side at a position where the first electrode layer 13 and the magnetic domain control layer 9 are laminated is taken as a reference surface G, the distance L1 from the reference surface G to the surface of the first electrode layer 13 on the upper gap layer 17 side is set shorter than the distance L2 from the reference surface G to the surface of the MR film 7 on the upper gap layer 17 side. In this embodiment, the distance L1 from the reference surface G to the surface of the first electrode layer 13 on the upper gap layer 17 side is set to about 30 nm at its narrowest position, whereas the distance L2 from the reference surface G to the surface of the MR film 7 on the upper gap layer 17 side is set to about 35 nm. Each area within which the distance L1 from the reference surface G to the surface of the first electrode layer 13 on the upper gap layer 17 side is set shorter than the distance L2 from the reference surface G to the surface of the MR film 7 on the upper gap layer 17 is separated from the respective end part of the MR film 7 in the track width direction by 10 nm to 200 nm, e.g., about 100 nm, in the track width direction. The above-mentioned relationship between the distances L1, L2 may include the respective protective films formed on the first electrode layer 13 and MR film 7.

Also, in the thin-film magnetic head MH1, the distance L3 between the lower magnetic shield layer 3 and upper magnetic shield layer 19 at each position where the magnetic domain control layer 9 and first electrode layer 13 are laminated is set shorter than the distance L4 between the lower magnetic shield layer 3 and upper magnetic shield layer 19 at the position where the MR film 7 is located. In this embodiment, the distance L3 between the lower magnetic shield layer 3 and upper magnetic shield layer 19 is set to about 60 nm at its narrowest position, whereas the distance L4 between the lower magnetic shield layer 3 and upper magnetic shield layer 19 is set to about 65 nm. Each area within which the distance L3 between the lower magnetic shield layer 3 and upper magnetic shield layer 19 is set shorter than the distance L4 between the lower magnetic shield layer 3 and upper magnetic shield layer 19 is separated from the respective end part of the MR film 7 in the track width direction by 10 nm to 200 nm, e.g., about 100 nm, in the track width direction.

The above-mentioned words "soft magnetic" and "hard magnetic" define magnitudes of coercive force. However, any substance including an out-of-spec material or structure in a microscopic or specific area may also be used as long as it exhibits a "soft magnetic" or "hard magnetic" function as a whole. For example, any substance including magnetically exchange-coupled materials having different magnetic characteristics or partly including a nonmagnetic material may be used as long as it exhibits a soft magnetic or hard magnetic function as a whole.

The magnetic domain control layers 9, first electrode layers 13, and second electrode layers 15 may be configured so as to include the protective layers formed on the upper and lower sides of the individual layers 9, 13, 15.

Under the influence of shadows of resist layers, the film forming rates of the magnetic domain control layers 9 and electrode layers 11 may differ between a position near the MR film 7 and a position distanced from the MR film 7. Therefore, thicknesses of the magnetic domain control layers 9 and electrode layers 11 refer to those at positions distanced from the MR film 7, where they are not influenced by shadows of resist layers.

Functions of the thin-film magnetic head MH1 will now be explained. By the magnetic domain control layer 9, the free layer of the MR film 7 is turned into a single magnetic domain in the track width direction. The direction of magnetization of the free layer in the MR film 7 varies depending on leakage magnetic fields from a magnetization transitional area, i.e., whether the magnetization transitional area is a north pole or a south pole. Since the direction of magnetization of the pinned layer in the MR film 7 is fixed by the pinning layer, the electron transmission rate (current) between a pair of electrode layers 11 varies because of the change in resistance corresponding to the cosine between the respective directions of magnetization of the free layer and pinned layer. A leakage magnetic field from a magnetization transitional area to be detected in a magnetic recording medium can be detected from the change in current. The magnetic field can also be detected by measuring a voltage while keeping a constant supply current (sense current). This kind of detection is used in general.

Magnetic recording of data will now be explained in brief. The magnetic field forming device RD for writing magnetic data is mechanically coupled onto the magnetic detector MD of the thin-film magnetic head MH1. Writing into the magnetization transitional area is effected by the leakage magnetic field from the magnetic field forming device RD.

With reference to FIGS. 2 to 8, an example of method of manufacturing the thin-film magnetic head MH1 in accordance with the first embodiment, the magnetic detector MD in particular, will now be explained. FIGS. 2 to 8 are schematic views for explaining an example of method of manufacturing the magnetic detector included in the thin-film magnetic head in accordance with this embodiment.

Figure 2:
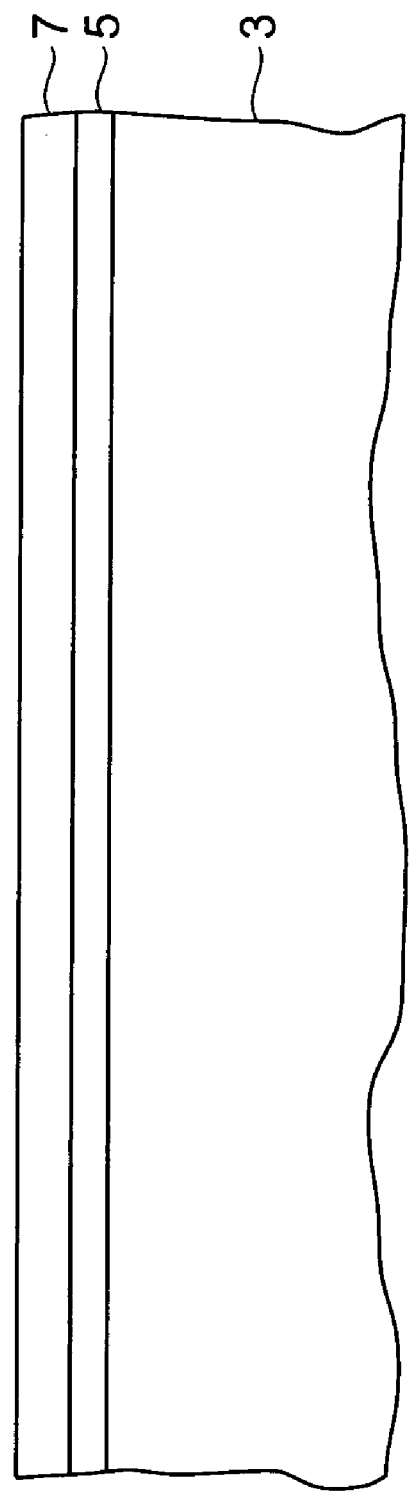
FIGS. 2 to 9 are schematic views for explaining an example of method of manufacturing a magnetic detector included in the thin-film magnetic head in accordance with the first embodiment.

First, as shown in FIG. 2, a lower magnetic shield layer 3, a lower gap layer 5, and an MR film 7 are successively formed on a nonmagnetic substrate (not depicted) so as to grow by predetermined thicknesses. Wet plating can be used as a method of forming the lower magnetic shield layer 3. Sputtering can be used as a method of forming the lower gap layer 5 and MR film 7. Not only electroless plating using a solution including a metal constituting a raw material, but also electroplating can be employed in wet plating.

Figure 3:
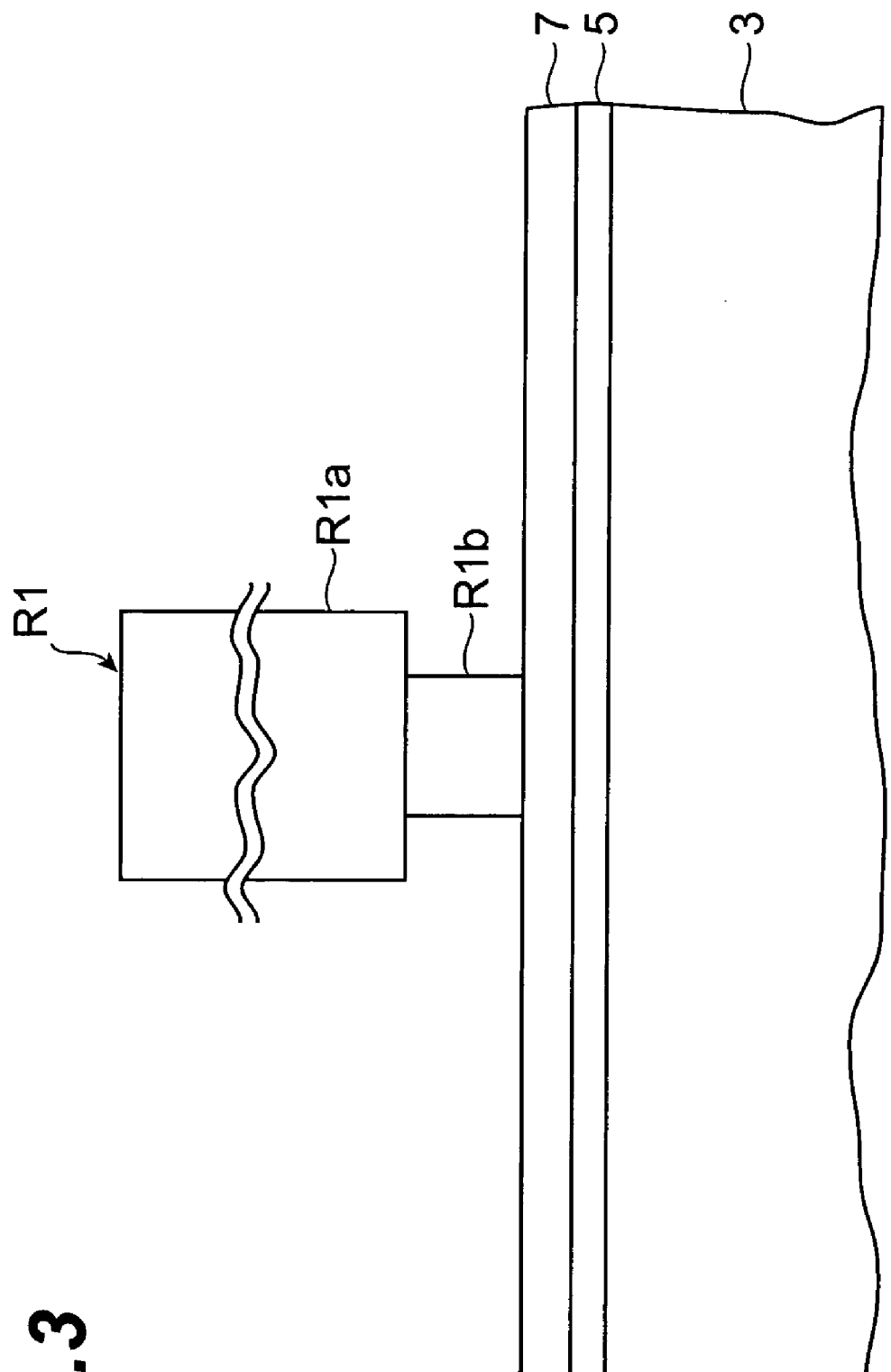

Subsequently, as shown in FIG. 3, a first resist layer R1 having a desirable pattern is formed on the MR film 7 formed by the foregoing process. The first resist layer R1 has a lower part R1b with a width (in the track width direction) shorter than that of an upper part R1a thereof, thereby forming an undercut. Photolithography can be used for forming the first resist layer R1. In this embodiment, the width of the lower part R1b in the first resist layer R1 is set to about 50 nm, whereas the width of the upper part R1a is set to about 130 nm. The first resist layer R1 may have a bridge structure, in which the lower part R1b has a width of 0 nm.

Figure 4:
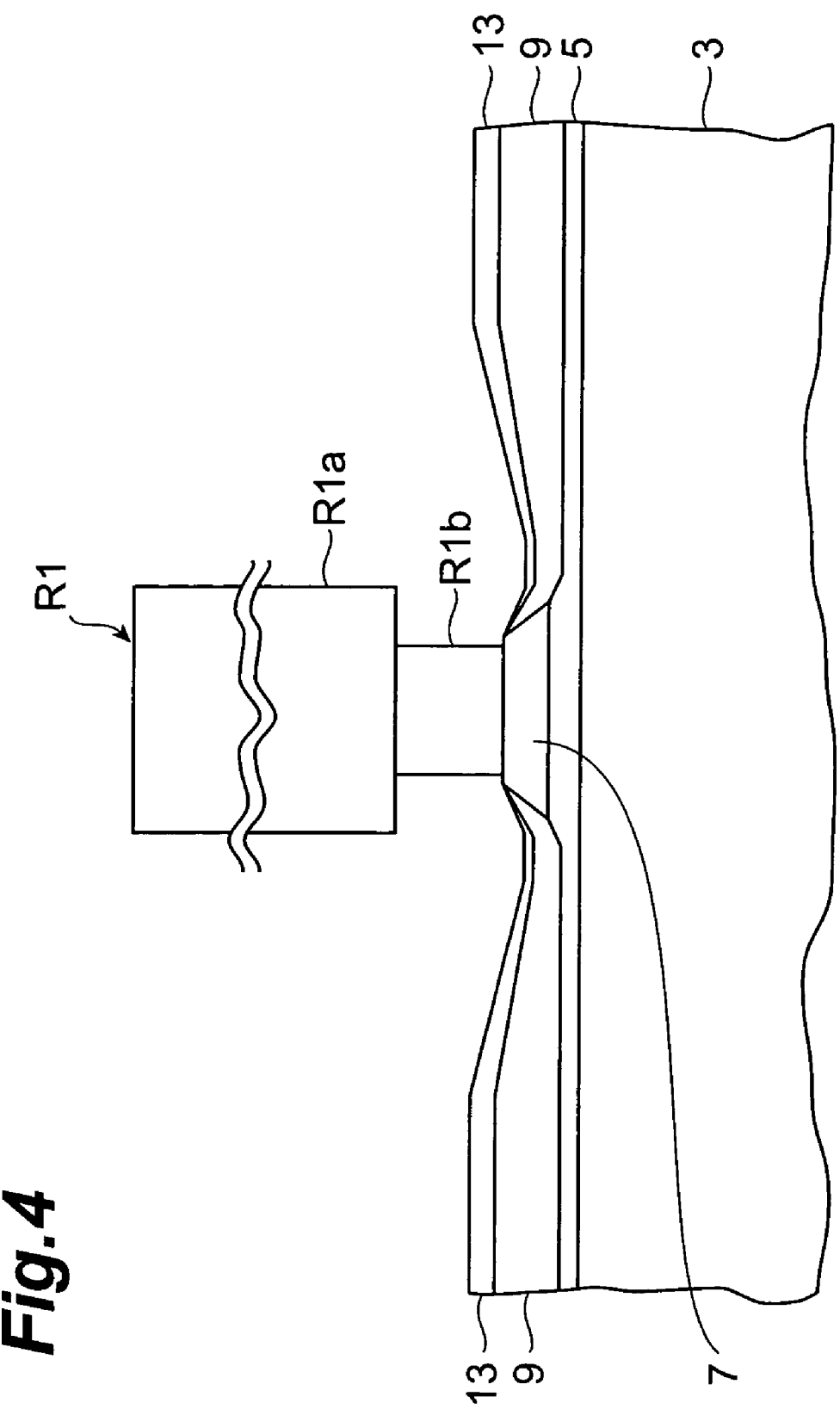

Then, as shown in FIG. 4, the first resist layer R1 formed by the foregoing process is used as a mask, so as to remove the exposed area in the MR film 7 along its depth from the surface side to the surface of the lower gap layer 5, so that the part of MR film 7 masked with the first resist layer R1 remains. Here, the part of lower gap layer 5 on the surface side may be removed as well. The distance between remaining parts becomes an optical track width. Etching such as ion milling can be used for the removal.

Also, as shown in FIG. 4, a magnetic domain control layer 9 and a first electrode layer 13 are successively formed on each of both sides of the MR film 7 left by the foregoing process, so as to grow by predetermined thicknesses. Sputtering or PVD such as ion beam deposition can be used as a method of forming the magnetic domain control layer 9 and first electrode layer 13.

Figure 5:
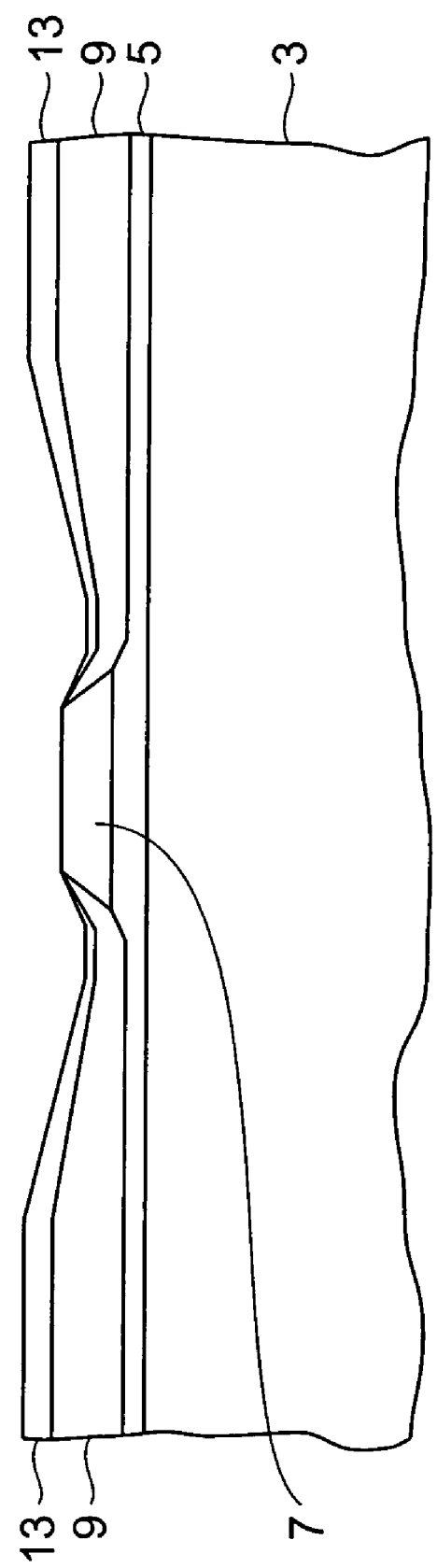

Subsequently, as shown in FIG. 5, the first resist layer R1 is removed (lifted off). This exposes the MR film 7.

Figure 6:
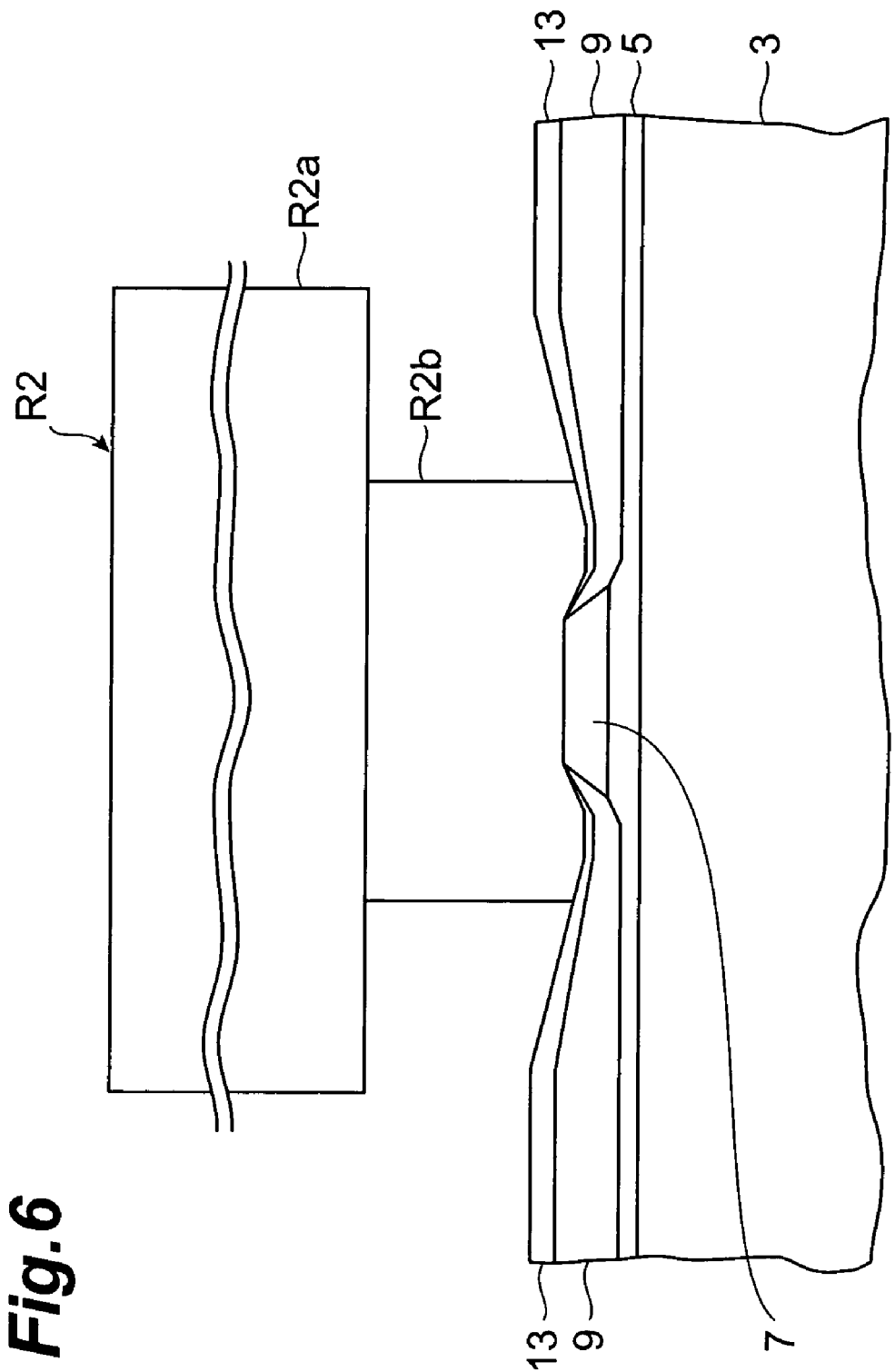

Then, as shown in FIG. 6, a second resist layer R2 having a desirable pattern is formed on the MR film 7 and first electrode layer 13 exposed by the foregoing process. The second resist layer R2 has a lower part R2b with a width (in the track width direction) shorter than that of an upper part R2a thereof, thereby forming an undercut. Photolithography can be used for forming the second resist layer R2. The width of the second resist layer R2 (in the track width direction) is greater than that of the first resist layer R1. In this embodiment, the width of the lower part R2b of the second resist layer R2 (in the track width direction) is greater than that of the first resist layer R1. In this embodiment, the width of the lower part R2b of the second resist layer R2 is set within the range of 150 nm to 400 nm, e.g., at about 200 nm, whereas the width of the upper part R2a is set within the range of 300 nm to 600 nm, e.g., at about 400 nm.

Figure 7:
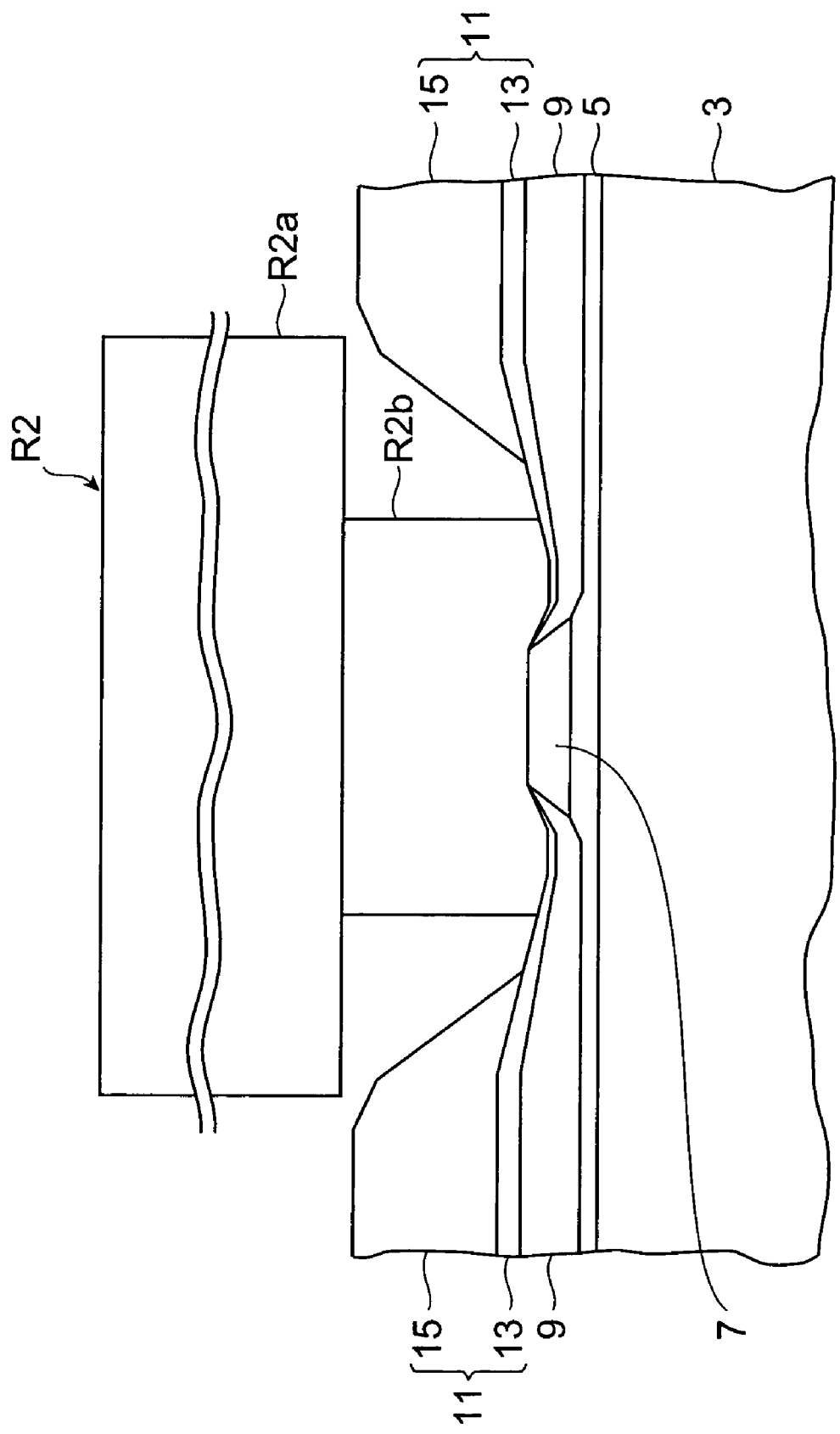

Subsequently, the second resist layer R2 formed by the foregoing process is used as a mask, so as to remove the surface of the first electrode layer 13 slightly. Then, as shown in FIG. 7, a second electrode layer 15 is formed on each first electrode layer 13 so as to grow by a predetermined thickness, while using the second resist layer R2 as a mask. As a consequence, the second electrode layer 15 is separated from an end part of the MR film 7 in the track width direction by a length corresponding to the size of the second resist layer R2 in the track width direction. Sputtering or PVD such as ion beam deposition can be used as a method of forming the second electrode layers 15.

Figure 8:
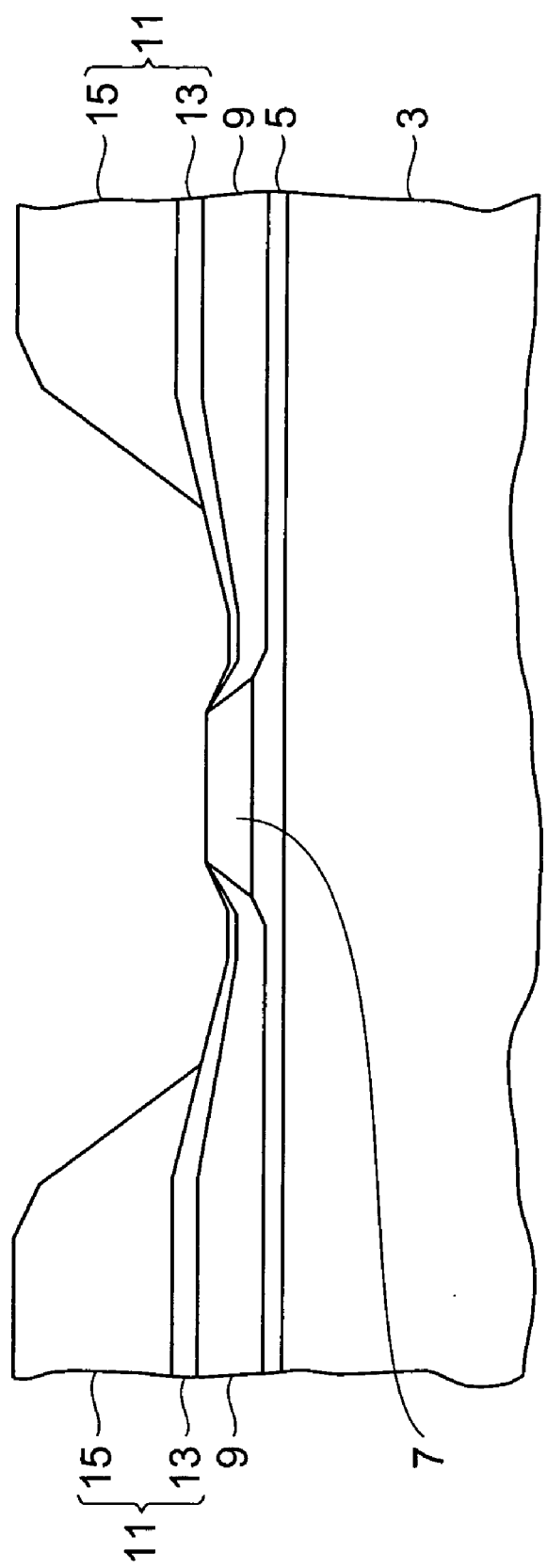

Next, as shown in FIG. 8, the second resist layer R2 is removed (lifted off). As a consequence, the MR film 7 is exposed again.

Figure 9:
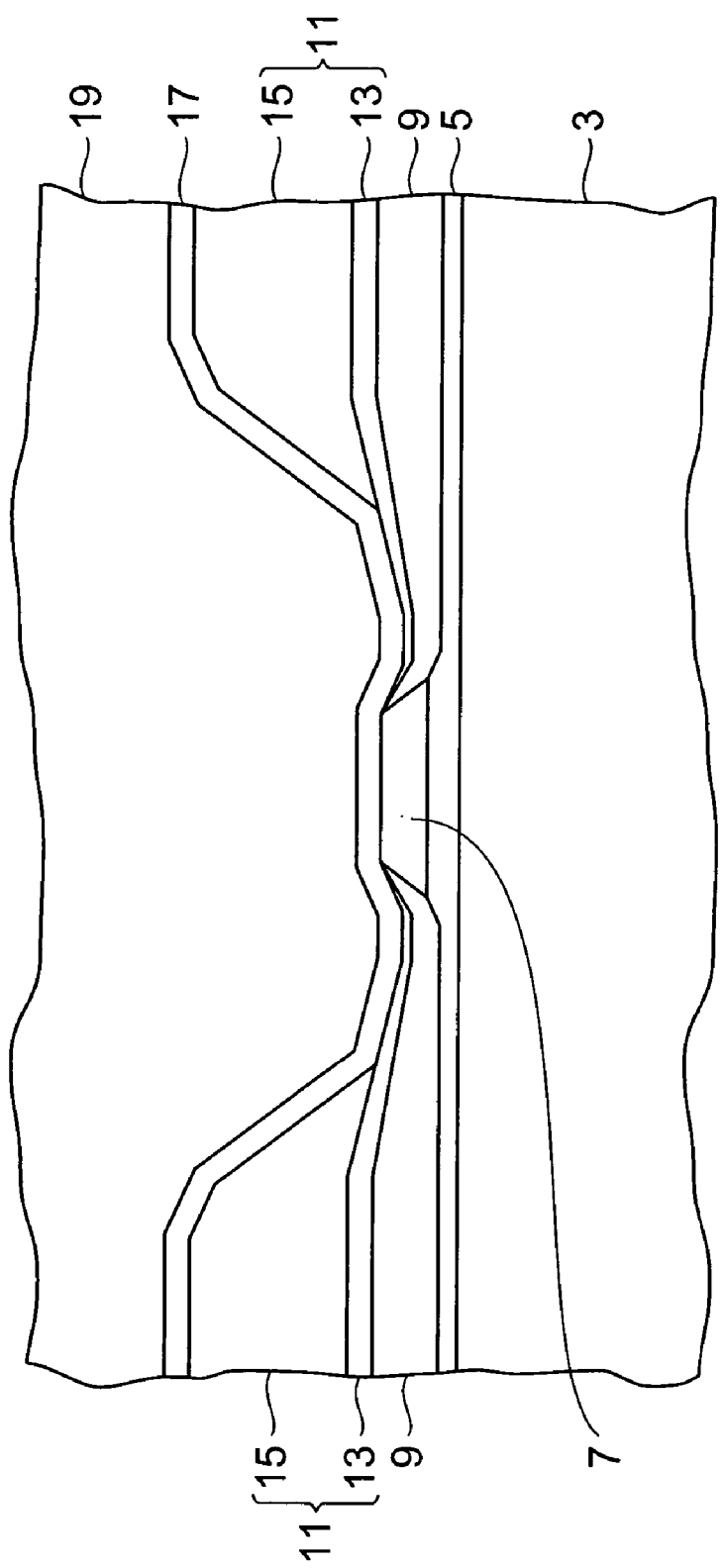

Further, as shown in FIG. 9, an upper gap layer 17 and an upper magnetic shield layer 19 are successively formed on the MR film 7, first electrode layers 13, and second electrode layers 15 so as to grow by predetermined thicknesses. This finishes the magnetic detector MD having the configuration shown in FIG. 1. Sputtering can be used as a method of forming the upper gap layer 17, whereas plating can be used as a method of forming the upper magnetic shield layer 19.

With reference to FIGS. 2 and 10 to 14, another example of method of manufacturing the magnetic detector MD in the first embodiment will be explained. FIGS. 10 to 14 are schematic views for explaining an example of method of manufacturing the magnetic detector MD in the thin-film magnetic head in accordance with the first embodiment.

Figure 10:
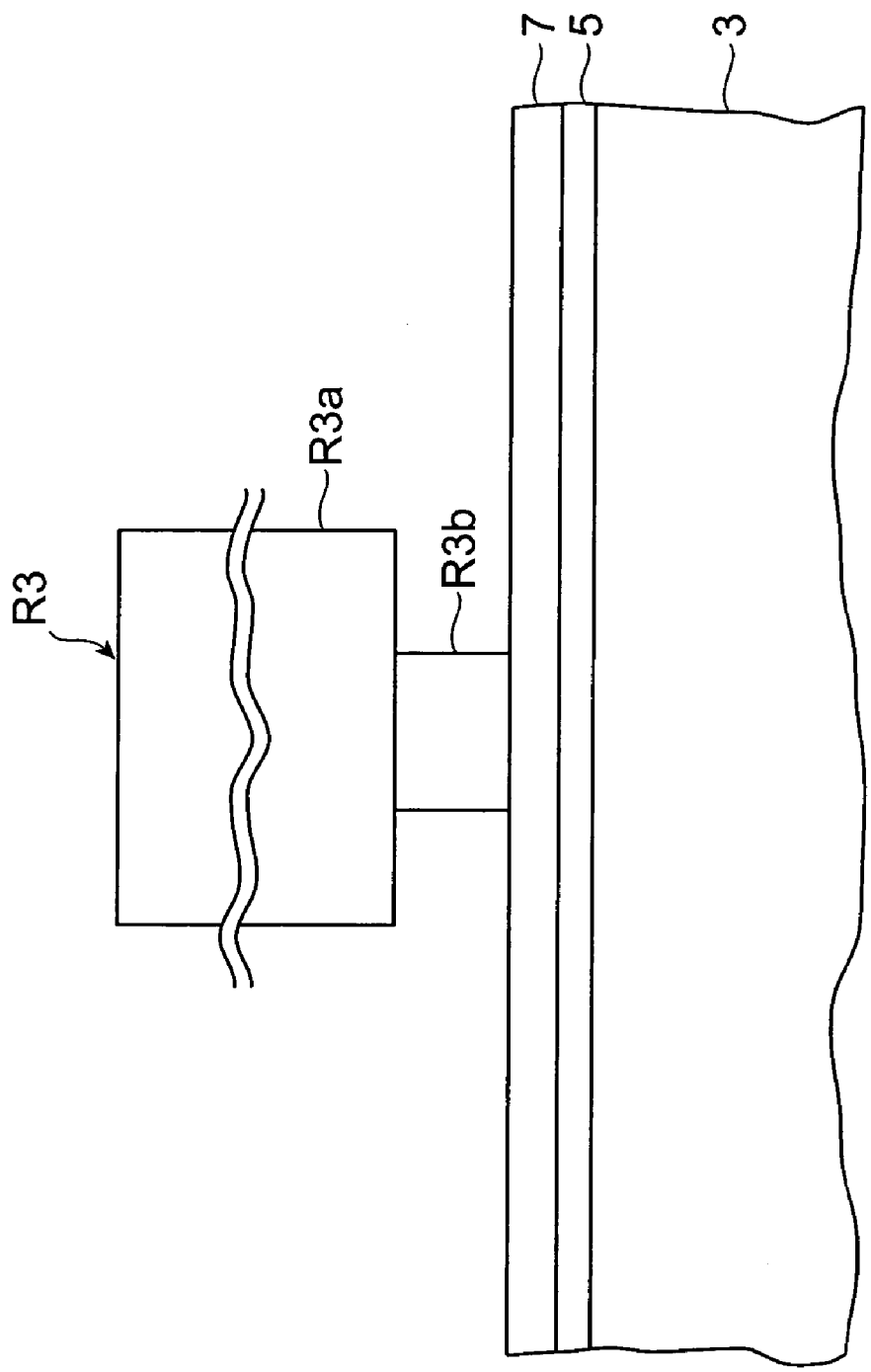
FIGS. 10 to 14 are schematic views for explaining an example of method of manufacturing the magnetic detector included in the thin-film magnetic head in accordance with the first embodiment.

First, as shown in FIG. 2, a lower magnetic shield layer 3, a lower gap layer 5, and an MR film 7 are successively formed on a nonmagnetic substrate. Subsequently, as shown in FIG. 10, a resist layer R3 having a desirable pattern is formed on the MR film 7 formed by this process. The third resist layer R3 has a lower part R3b with a width (in the track width direction) shorter than that of an upper part R3a thereof, thereby forming an undercut. Photolithography can be used for forming the third resist layer R3. In this embodiment, the width of the lower part R3b in the third resist layer R3 is set to about 50 nm, whereas the width of the upper part R3a is set to about 130 nm. The third resist layer R3 may have a bridge structure, in which the lower part R3b has a width of 0 nm.

Figure 11:
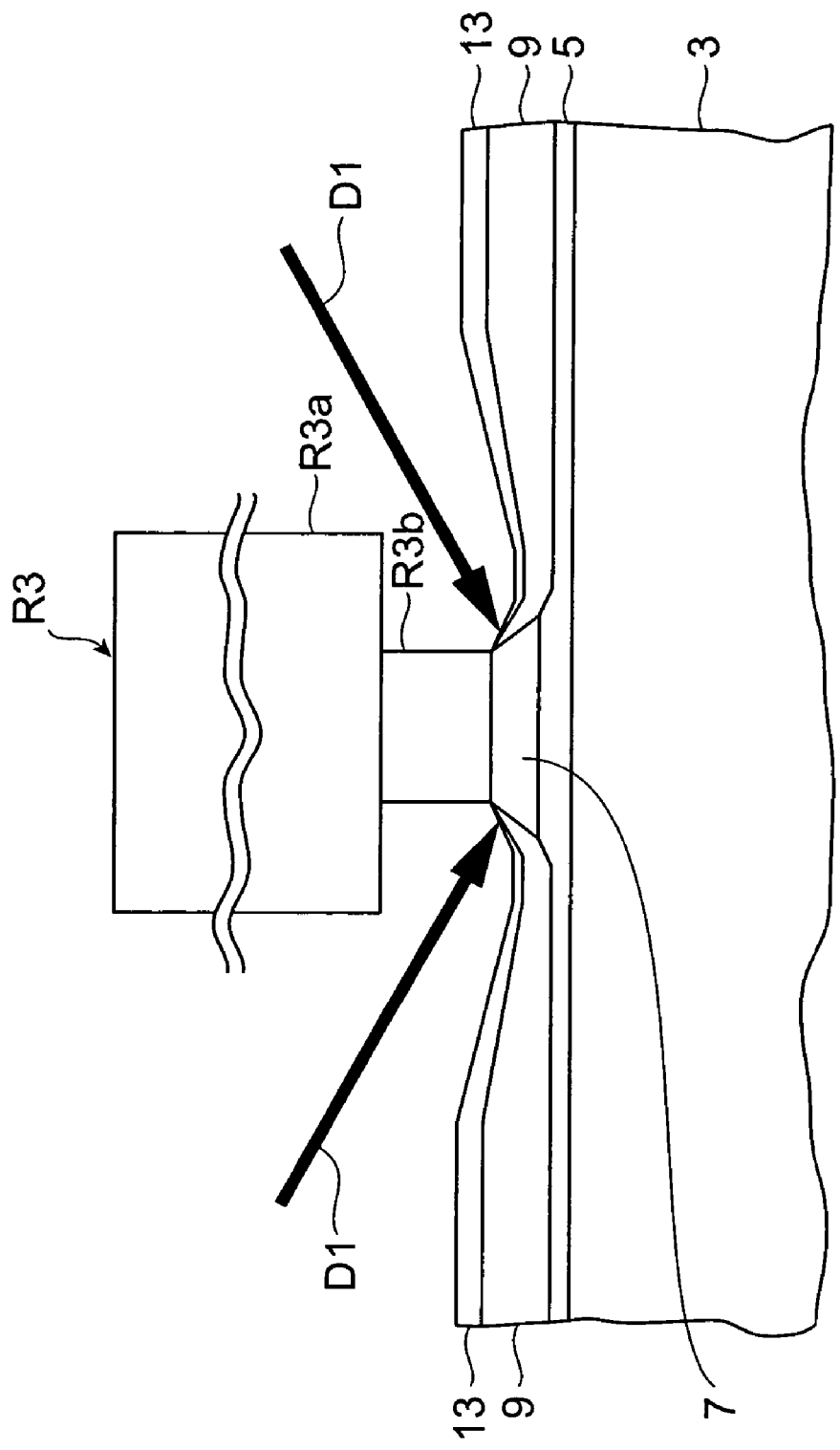

Subsequently, as shown in FIG. 11, the resist layer R3 formed by the foregoing process is used as a mask, so as to remove the exposed area in the MR film 7 along its depth from the surface side to the surface of the lower gap layer 5, so that the part of MR film 7 masked with the resist layer R3 remains. Here, the part of lower gap layer 5 on the surface side may be removed as well. The distance between remaining parts becomes an optical track width. Etching such as ion milling can be used for the removal.

Also, as shown in FIG. 11, a magnetic domain control layer 9 and a first electrode layer 13 are successively formed on each of both sides of the MR film 7 left by the foregoing process, so as to grow by predetermined thicknesses. The magnetic domain control layers 9 and first electrode layers 13 are formed by depositing the material substances constituting the magnetic domain control layers 9 and first electrode layers 13 in directions D1 inclined by a predetermined first angle from a direction perpendicular to the main surface of the nonmagnetic substrate, while using the resist layer R3 as a mask. Sputtering or PVD such as ion beam deposition can be used as a method of forming the magnetic domain control layers 9 and first electrode layers 13. In this embodiment, the predetermined first angle is set to about 40°.

Figure 12:
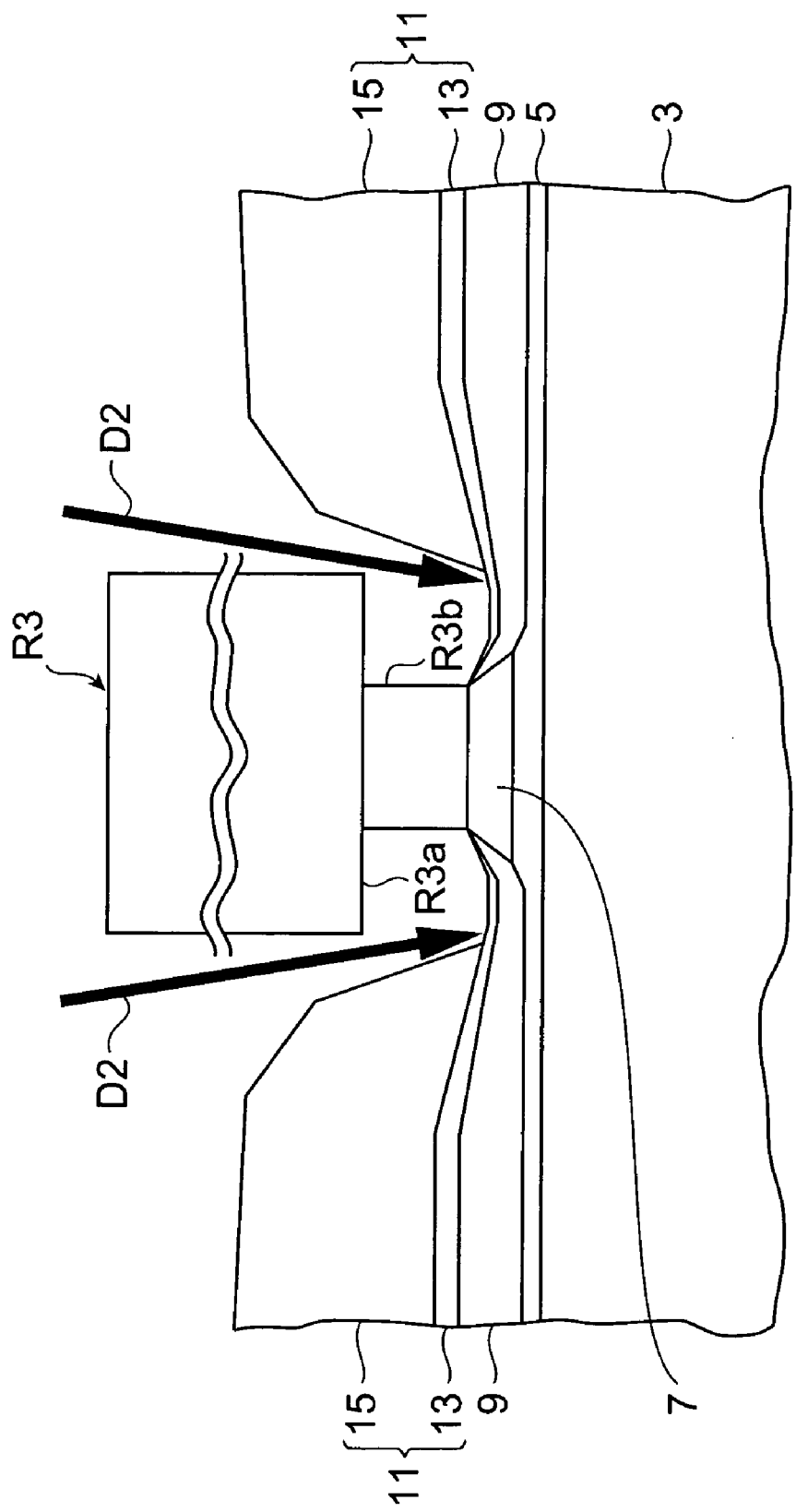

Subsequently, as shown in FIG. 12, a second electrode layer 15 is formed on each first electrode layer 13 so as to grow by a predetermined thickness. The second electrode layers 15 are formed by depositing a material substance constituting the second electrode layers 15 in directions D2 inclined by a predetermined second angle from a direction perpendicular to the main surface of the nonmagnetic substrate, while using the resist layer R3 as a mask. As a consequence, each second electrode layer 15 is separated from an end part of the MR film 7 in the track width direction by a length corresponding to the predetermined second angle in the track width direction. Sputtering or PVD such as ion beam deposition can be used as a method of forming the second electrode layers 15. In this embodiment, the predetermined first angle is set within the range of 0° to 30°, e.g., at about 20°.

Figure 13:
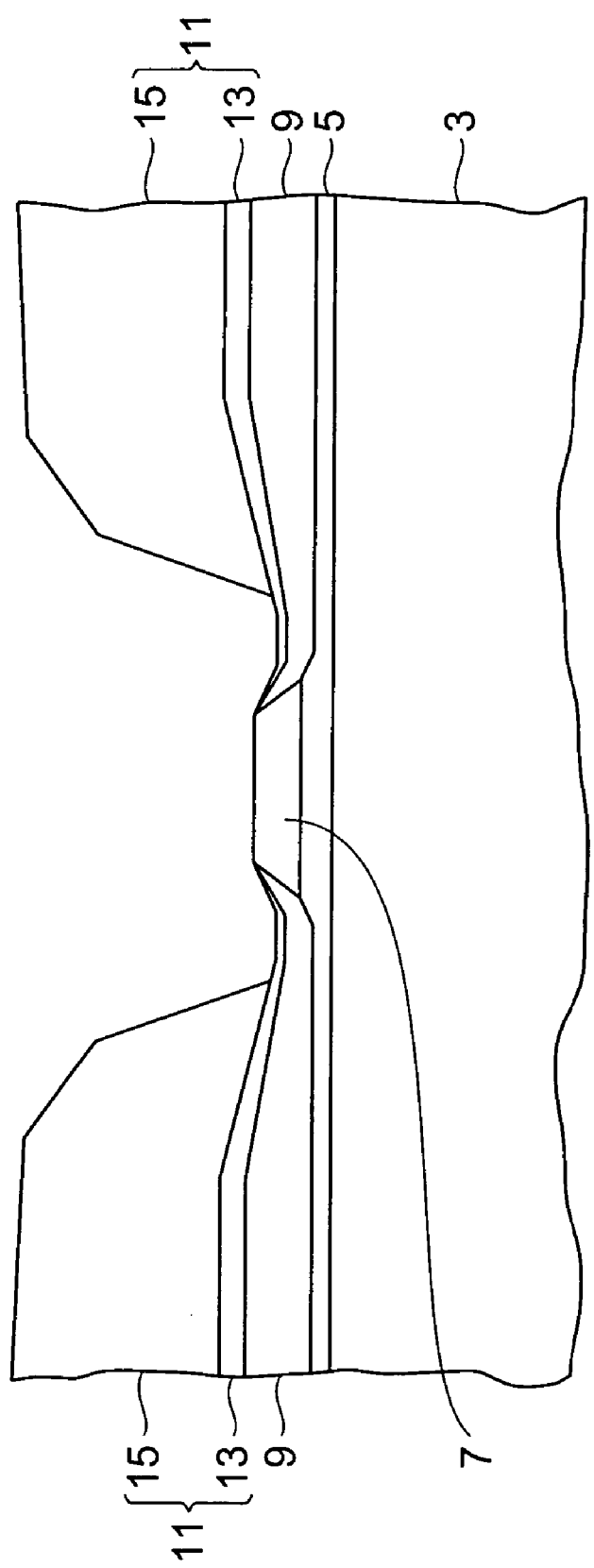

Next, as shown in FIG. 13, the resist layer R3 is removed (lifted off). As a consequence, the MR film 7 is exposed again.

Figure 14:
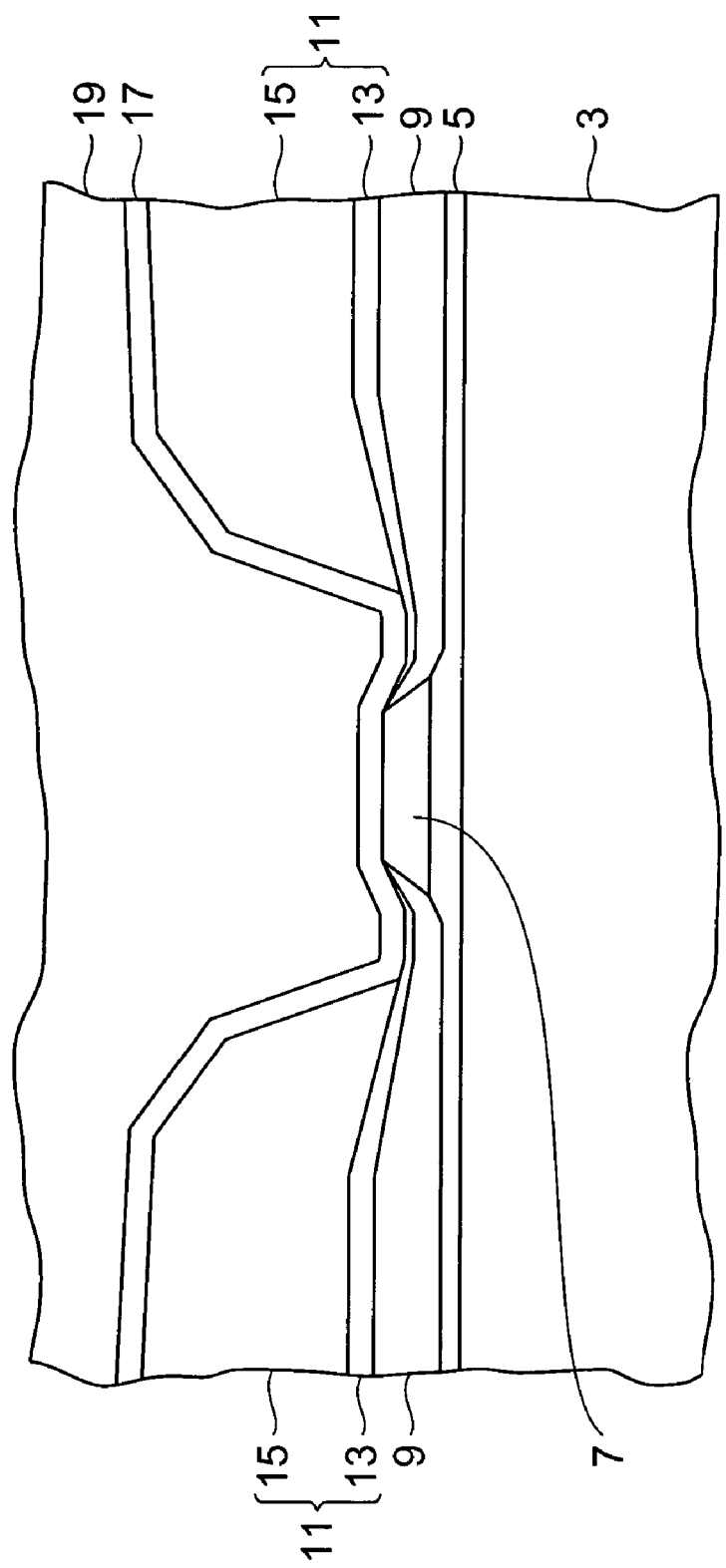

Further, as shown in FIG. 14, an upper gap layer 17 and an upper magnetic shield layer 19 are successively formed on the MR film 7, first electrode layers 13, and second electrode layers 15 so as to grow by predetermined thicknesses. This finishes the magnetic detector MD having a configuration similar to that shown in FIG. 1. Sputtering can be used as a method of forming the upper gap layer 17, whereas plating can be used as a method of forming the upper magnetic shield layer 19.

As in the foregoing, while the surface of each magnetic domain control layer 9 on the lower gap layer 5 side at a position where the first electrode layer 13 and magnetic domain control layer 9 are laminated is taken as a reference surface G, the distance L1 from the reference surface G to the surface of the first electrode layer 13 on the upper gap layer 17 side is set shorter than the distance L2 from the reference surface G to the surface of the MR film 7 on the upper gap layer 17 side in the first embodiment, whereby the distance L3 between the lower magnetic shield layer 3 and upper magnetic shield layer 19 at the position where the first electrode layer 13 and magnetic domain control layer 9 are laminated can be made shorter than the distance L4 between the lower magnetic shield layer 3 and upper magnetic shield layer 19 at the position where the MR film 7 is located. This further reduces the seepage in reading at both end parts of the MR film 7 in the track width direction. As a result, the effective track width can effectively restrained from expanding, and a very high output stability can be realized.

Also, the thin-film magnetic head MH1 comprises the second electrode layer 15 separated from each end part of the MR film 7 in the track width direction by at least a predetermined length in the track width direction and connected to the first electrode layer 13. This can lower the resistance of the electrode layer 11 (first electrode layer 13 and second electrode layer 15), thereby enhancing the read output.

In the first embodiment, the thickness of the second electrode layers 15 is set greater than that of the first electrode layers 13. This can further lower the resistance of the electrode layer 11.

In a method of manufacturing the magnetic detector MD in accordance with the first embodiment, the second electrode layers 15 are formed on the first electrode layers 13 while using the second resist layer R2 having a desirable pattern wider than the first resist layer R1 as a mask, whereby each second electrode layer 15 is separated from an end part of the MR film 7 in the track width direction by a length corresponding to the size of the second resist layer R2 in the track width direction. As a result, a configuration which can suppress the thickness of the magnetic domain control layer 9 and electrode layer 11 (first electrode layer 13) laminated on each side of the MR film 7 can easily be obtained.

In another method of manufacturing the magnetic detector MD in accordance with the first embodiment, the second electrode layers 15 are formed on the first electrode layers 13 by depositing the material substance constituting the second electrode layers 15 at a predetermined second angle greater than a predetermined first angle for depositing the material substance constituting the first electrode layers 13 for forming the first electrode layers 13 while using the resist layer R3 as a mask, whereby each second electrode layer 15 is separated from an end part of the MR film 7 in the track width direction by a length corresponding to the predetermined second angle in the track width direction. As a result, a configuration which can suppress the thickness of the magnetic domain control layer 9 and electrode layer 11 (first electrode layer 13) laminated on each side of the MR film 7 can easily be obtained.

Second Embodiment

Figure 15:
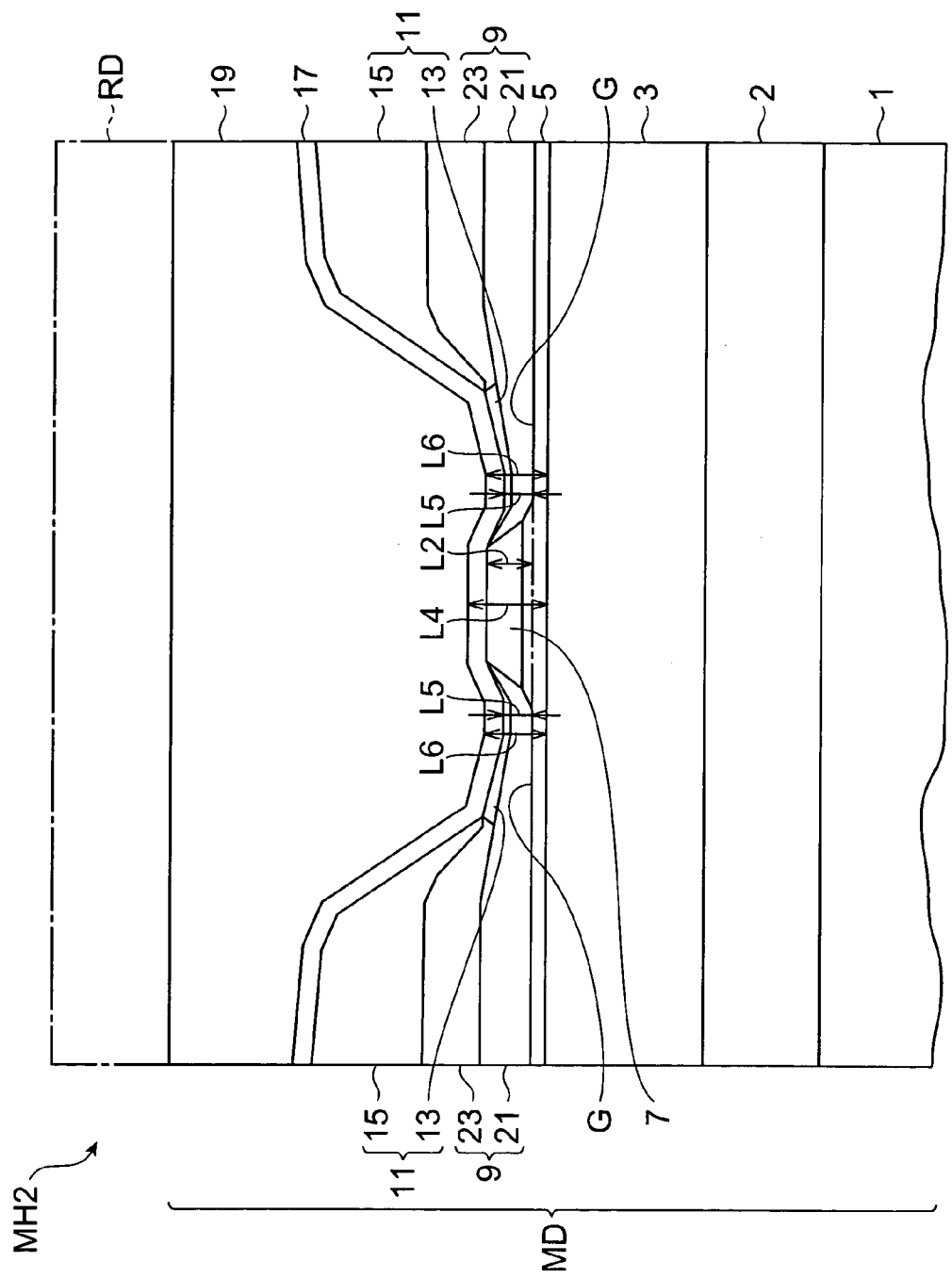
FIG. 15 is a schematic view for explaining the structure of the thin-film magnetic head in accordance with a second embodiment.

FIG. 15 is a schematic view for explaining the cross-sectional structure of a thin-film magnetic head MH2. The thin-film magnetic head MH2 differs from the thin-film magnetic head MH1 in that it comprises first and second magnetic domain control layers, and so forth. FIG. 15 is a view showing the cross-sectional structure of the thin-film magnetic head MH2 as seen from the air bearing surface.

Each magnetic domain control layer 9 includes a first magnetic domain control layer 21 and a second magnetic domain control layer 23.

The first magnetic domain control layer 21 is a laminate film composed of an undercoat layer made of CrTi, TiW, or the like, and a hard magnetic layer made of CoPt, CoCrPt, CoTa, or the like, and has a high coercive force. The first magnetic domain control layers 21 is provided on each of both flanks of an MR film 7 by way of a protective layer (not depicted). The first magnetic domain control layer 21 may be a laminate film composed of a magnetic layer and an antiferromagnetic layer such as a NiFe/IrMn laminate film. The protective layer is made of a metal material such as Ta, and is formed on a side part of the MR film 7 and on a lower gap layer 5. The thickness of the first magnetic domain control layer 21 is set to 15 nm to 50 nm. For the undercoat layer, not only CrTi and TiW, but also Cr, W, and FeCo, as well as substances including them which yield a body-centered cubic lattice can be used.

Each second magnetic domain control layer 23 is disposed while being separated from an end part of the MR film 7 in the track width direction thereof by a predetermined length in the track width direction. The second magnetic domain control layer 23 is made of a hard magnetic material having a high coercive force such as CoCrPt, CoPt, CoTa, and a CrTi/CoCrPt laminate film, and is formed on the protective layer formed on the first magnetic domain control layer 21. The second magnetic domain control layer 23 may be a laminate film composed of a magnetic layer and an antiferromagnetic layer such as a NiFe/IrMn laminate film. A protective layer (not depicted), which is made of Ta or the like, is formed on the second magnetic domain control layer 23. In this embodiment, the predetermined length is set within the range of 10 nm to 200 nm, e.g., at about 100 nm. The thickness of the second magnetic domain control layer 23 is set to 20 nm to 70 nm.

Each first electrode layer 13 is formed on the protective film formed on the first magnetic domain control layer 21. Namely, the first electrode layer 13 is disposed over the predetermined length from an end part of the MR film 7 in the track width direction to the position where the second magnetic domain control layer 23 is located. In this embodiment, the thickness of the first electrode layer 13 is set to 0 nm to 30 nm.

Each second electrode layer 15 is formed on the protective layer formed on the second magnetic domain control layer 23. Namely, the second electrode layer 15 is separated from an end part of the MR film 7 in the track width direction by the predetermined length in the track width direction. In this embodiment, the thickness of the second electrode layer 15 is set to 20 nm to 100 nm.

The first magnetic domain control layers 21, second magnetic domain control layers 23, first electrode layers 13, and second electrode layers 15 may be configured so as to include the protective layers formed on the upper and lower sides of the individual layers 21, 23, 13, 15.

In the thin-film magnetic head MH2, while the surface of each first magnetic domain control layer 21 on the lower gap layer 5 side at a position where the first electrode layer 13 and first magnetic domain control layer 21 are laminated is taken as a reference surface G, the distance L5 from the reference surface G to the surface of the first electrode layer 13 on the upper gap layer 17 side is set shorter than the distance L2 from the reference surface G to the surface of the MR film 7 on the upper gap layer 17 side. In this embodiment, the distance L5 from the reference surface G to the surface of the first electrode layer 13 on the upper gap layer 17 side is set to about 30 nm at its narrowest position. Each area within which the distance L5 from the reference surface G to the surface of the first electrode layer 13 on the upper gap layer 17 side is set shorter than the distance L2 from the reference surface G to the surface of the MR film 7 on the upper gap layer 17 side is separated from the respective end part of the MR film 7 in the track width direction by 10 nm to 200 nm, e.g., about 100 nm, in the track width direction. The above-mentioned relationship between the distances L5, L2 may include the respective protective films formed on the first electrode layer 13 and MR film 7.

Also, in the thin-film magnetic head MH2, the distance L6 between the lower magnetic shield layer 3 and upper magnetic shield layer 19 at each position where the first magnetic domain control layer 21 and first electrode layer 13 are laminated is set shorter than the distance L4 between the lower magnetic shield layer 3 and upper magnetic shield layer 19 at the position where the MR film 7 is located. In this embodiment, the distance L6 between the lower magnetic shield layer 3 and upper magnetic shield layer 19 is set to about 60 nm at its narrowest position. Each area within which the distance L6 between the lower magnetic shield layer 3 and upper magnetic shield layer 19 is set shorter than the distance L4 between the lower magnetic shield layer 3 and upper magnetic shield layer 19 is separated from the respective end part of the MR film 7 in the track width direction by 10 nm to 200 nm, e.g., about 100 nm, in the track width direction.

With reference to FIGS. 2, 3, and 16 to 21, an example of method of manufacturing the thin-film magnetic head MH2 in accordance with the second embodiment, the magnetic detector MD in particular, will now be explained. FIGS. 16 to 21 are schematic views for explaining an example of method of manufacturing the magnetic detector included in the thin-film magnetic head in accordance with the second embodiment.

First, as shown in FIG. 2, a lower magnetic shield layer 3, a lower gap layer 5, and an MR film 7 are successively formed on a nonmagnetic substrate (not depicted) so as to grow by predetermined thicknesses. Subsequently, as shown in FIG. 3, a first resist layer R1 having a desirable pattern is formed on the MR film 7 formed by the foregoing process.

Figure 16:
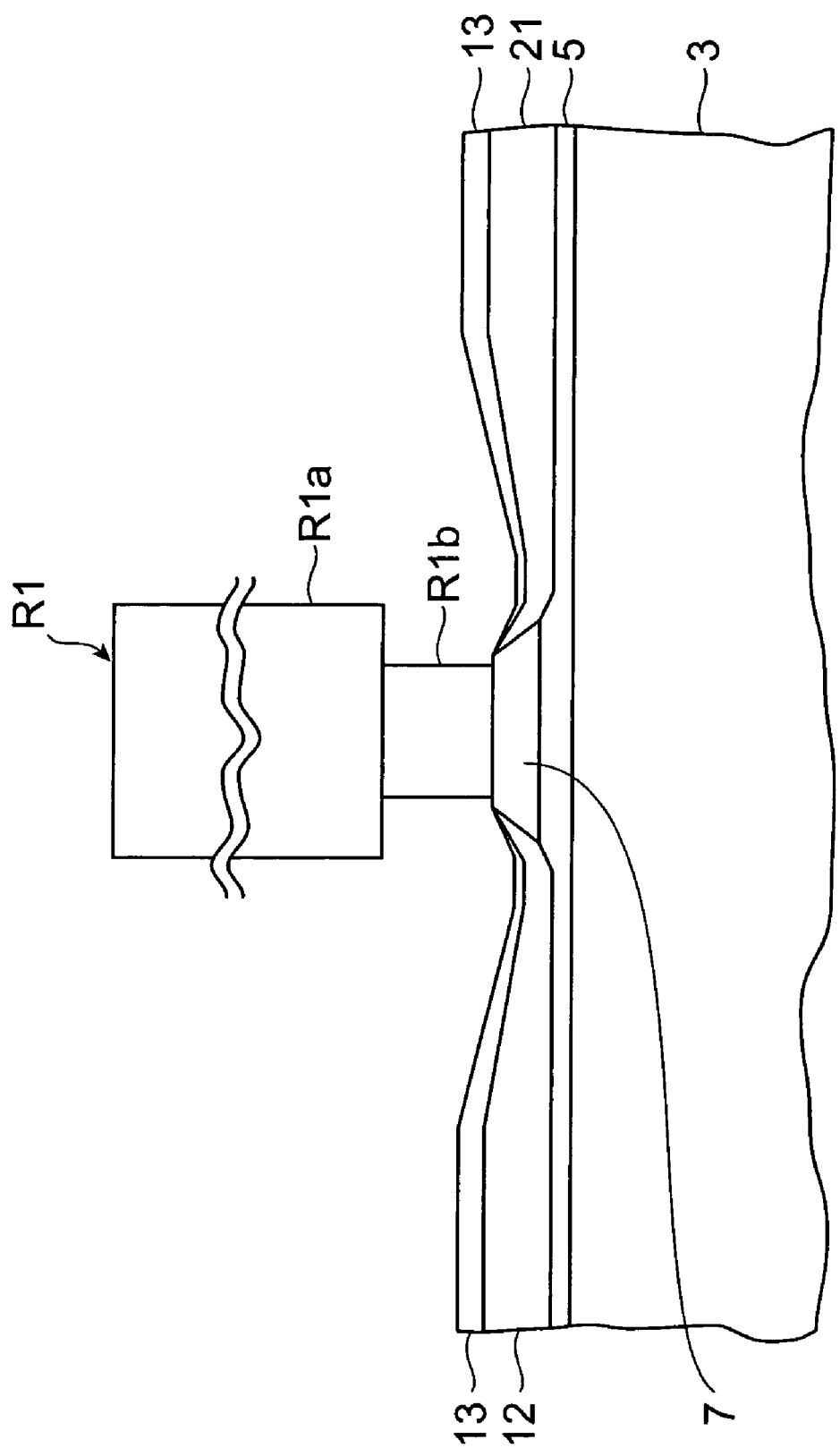
FIGS. 16 to 21 are schematic views for explaining an example of method of manufacturing a magnetic detector included in the thin-film magnetic head in accordance with the second embodiment.

Then, as shown in FIG. 16, the first resist layer R1 formed by the foregoing process is used as a mask, so as to remove the exposed area in the MR film 7 along its depth from the surface side to the surface of the lower gap layer 5, so that the part of MR film 7 masked with the first resist layer R1 remains. Also, as shown in FIG. 16, a first magnetic domain control layer 21 and a first electrode layer 13 are successively formed on each of both sides of the MR film 7 left by the foregoing process, so as to grow by predetermined thicknesses. The method of forming the first magnetic domain control layer 21 is the same as the method of forming the magnetic domain control layer 9 in the first embodiment and thus will not be explained in detail.

Figure 17:
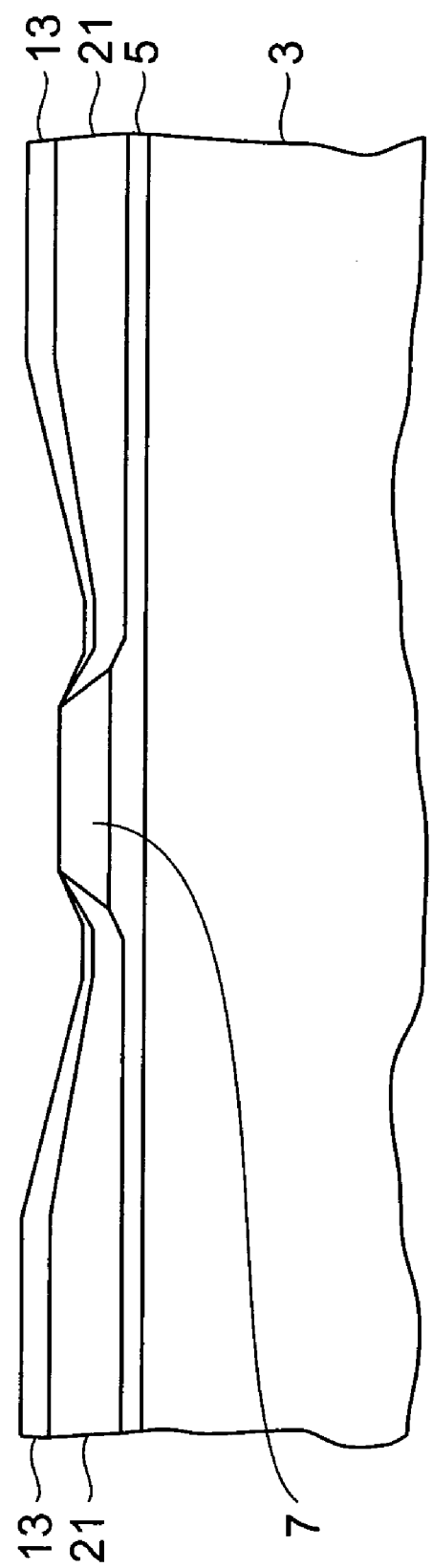
Figure 18:
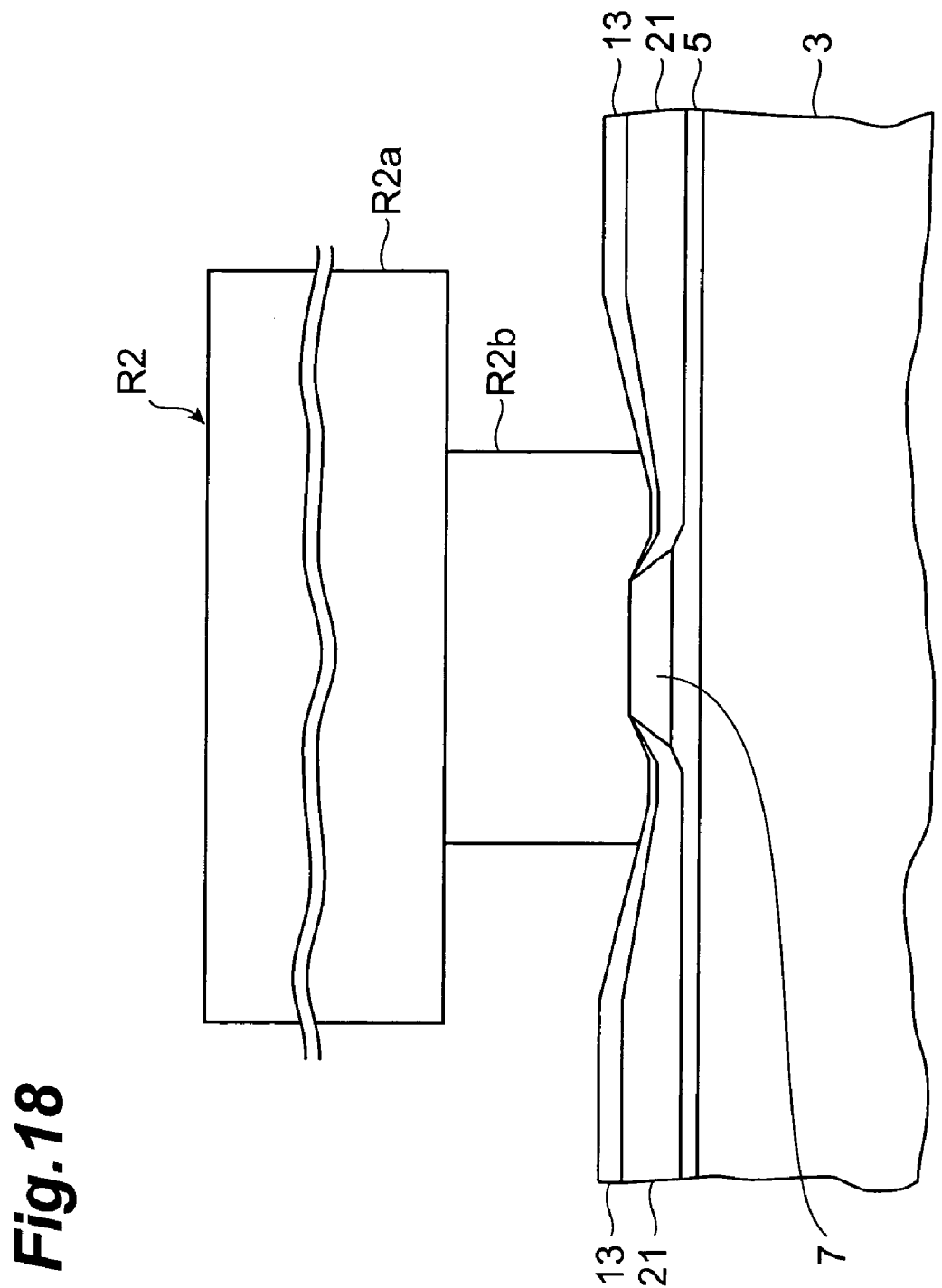

Subsequently, as shown in FIG. 17, the first resist layer R1 is removed (lifted off). Then, as shown in FIG. 18, a second resist layer R2 having a desirable pattern is formed on the MR film 7 and first electrode layer 13 exposed by the foregoing process.

Figure 19:
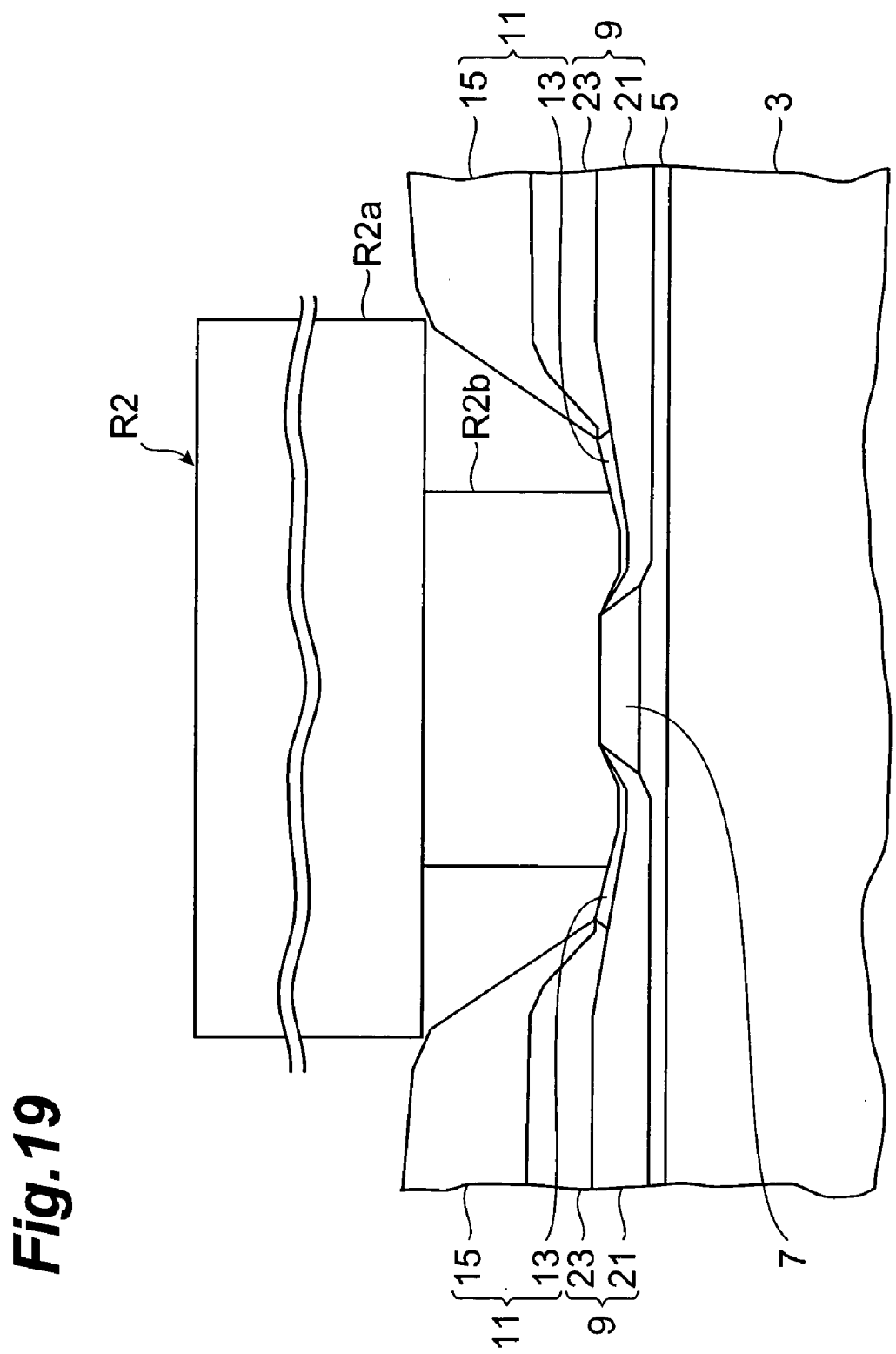

Subsequently, as shown in FIG. 19, the second resist layer R2 formed by the foregoing process is used as a mask, so as to remove the exposed area in the first electrode layer 13 along its depth from the surface side to the surface of the first magnetic domain control layer 21, so that the part of first electrode layer 13 masked with the second resist layer R2 remains. Here, the surface side part of the first magnetic domain control layer 21 may be removed as well. Etching such as ion milling can be used for the removal.

Then, as shown in FIG. 19, the second resist layer R2 is used as a mask, so that a second magnetic domain control layer 23 and a second electrode layer 15 are successively formed so as to grow by predetermined thicknesses on the first magnetic domain control layer 21 on each of both sides of the first electrode layer 13 left by the foregoing process. Sputtering or PVD such as ion beam deposition can be used as a method of forming the second magnetic domain control layers 23 and second electrode layers 15.

Figure 20:
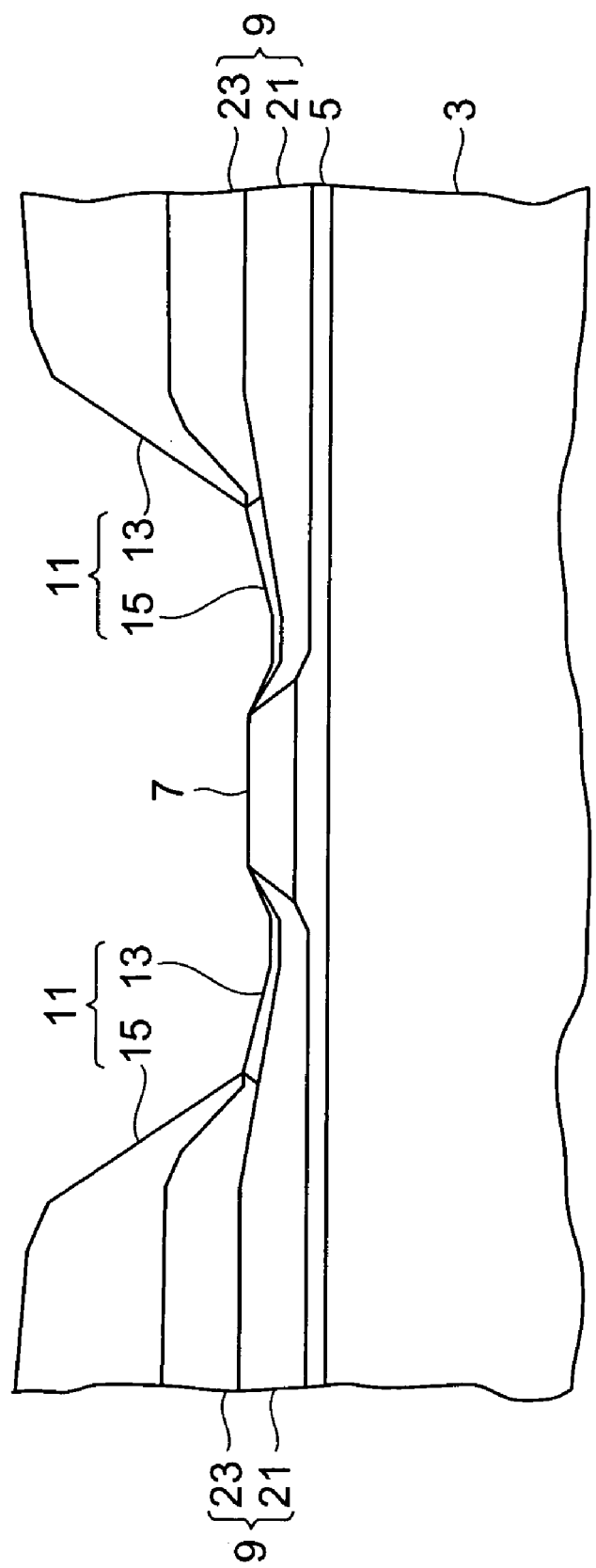
Figure 21:
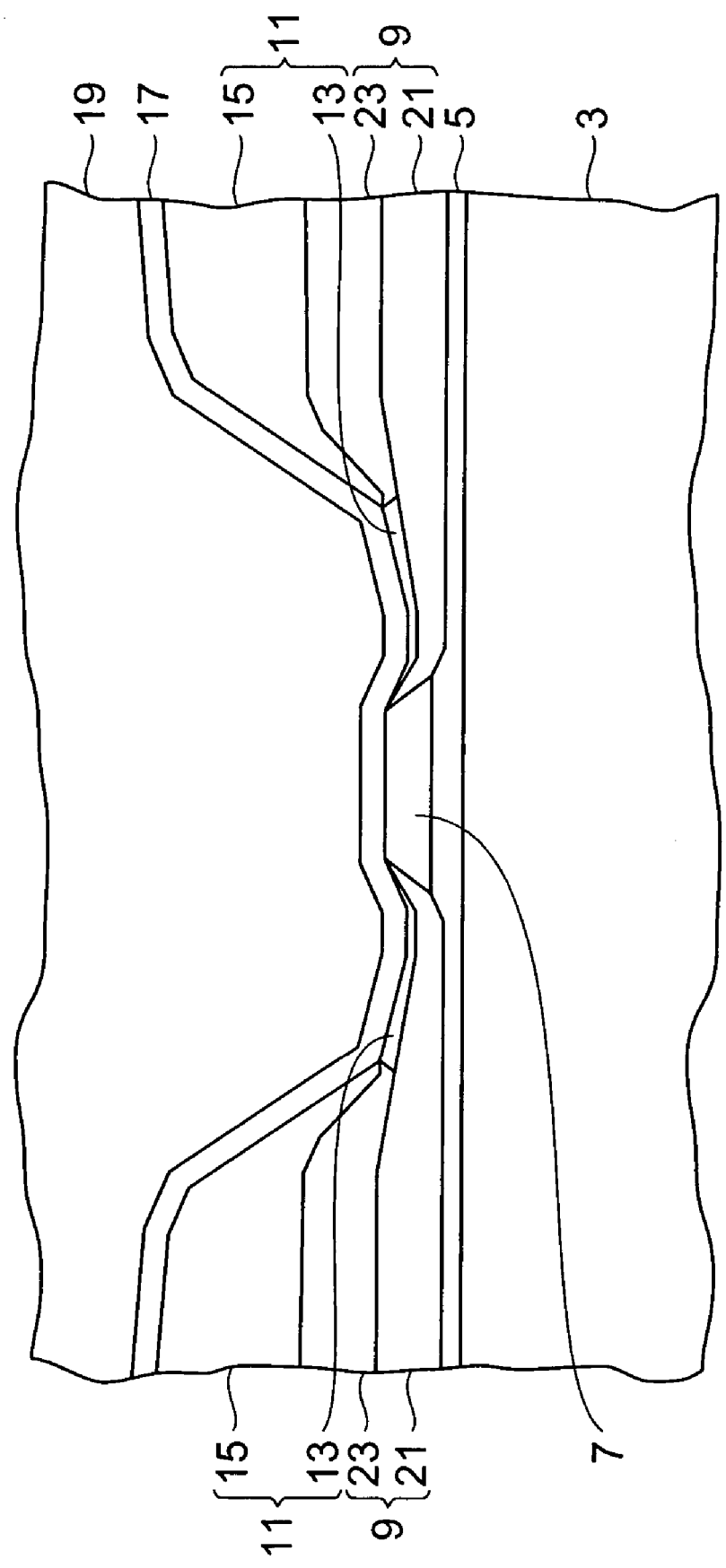

Next, as shown in FIG. 20, the second resist layer R2 is removed (lifted off). Further, as shown in FIG. 21, an upper gap layer 17 and an upper magnetic shield layer 19 are successively formed on the MR film 7, first electrode layers 13, and second electrode layers 15 so as to grow by predetermined thicknesses. This finishes the magnetic detector MD having the configuration shown in FIG. 15.

As in the foregoing, while the surface of each first magnetic domain control layer 21 on the lower gap layer 5 side at a position where the first electrode layer 13 and first magnetic domain control layer 21 are laminated is taken as a reference surface G, the distance L5 from the reference surface G to the surface of the first electrode layer 13 on the upper gap layer 17 side is set shorter than the distance L2 from the reference surface G to the surface of MR film 7 on the upper gap layer 17 side in the second embodiment, whereby the distance L6 between the lower magnetic shield layer 3 and upper magnetic shield layer 19 at the position where the first electrode layer 13 and first magnetic domain control layer 21 are laminated can be made shorter than the distance L4 between the lower magnetic shield layer 3 and upper magnetic shield layer 19 at the position where the MR film 7 is located. This further reduces the seepage in reading at both end parts of the MR film 7 in the track width direction. As a consequence, the effective track width can effectively be restrained from expanding, and a very high output stability can be realized.

Also, the thin-film magnetic head MH2 comprises the second magnetic domain control layer 23 separated from each end part of the MR film 7 in the track width direction by at least a predetermined length in the track width direction and laminated on each first magnetic domain control layer 21. This can stabilize the longitudinal bias magnetic field applied to the MR film 7, thereby further enhancing the output stability.

In the method of manufacturing the magnetic detector MD in accordance with the second embodiment, the second magnetic domain control layer 23 and second electrode layer 15 are successively formed on each first magnetic domain control layer 21 while using the second resist layer R2 having a desirable pattern wider than the first resist layer R1 as a mask, whereby each of the second magnetic domain control layer 23 and second electrode layer 15 is separated from an end part of the MR film 7 in the track width direction by a length corresponding to the size of the second resist layer R2 in the track width direction. As a result, a configuration which can suppress the thickness of the magnetic domain control layer 9 (first magnetic domain control layer 21) and electrode layer 11 (first electrode layer 13) laminated on each side of the MR film 7 can easily be obtained.

An area within which the distance L1, L5 from the reference surface G to the surface of the electrode layer 11 on the upper gap layer 17 side is set shorter than the distance L2 from the reference surface G to the surface of the MR film 7 on the upper gap layer 17 side will now be studied. Here, only one side part from the air bearing surface (plane parallel to the laminating direction of the layers in the MR film 7) will be discussed.

Figure 22:
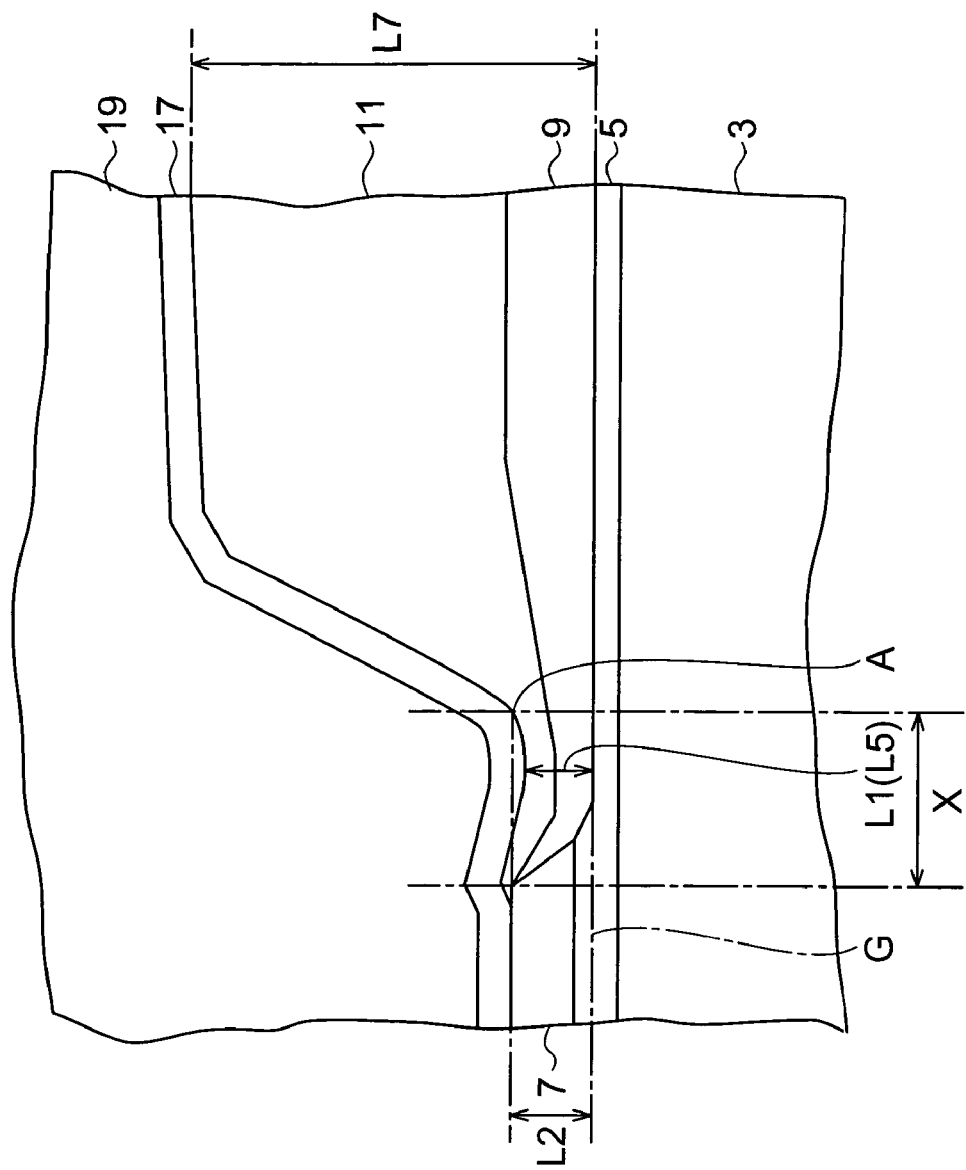
FIG. 22 is a schematic view for explaining the structure of a thin-film magnetic head (magnetic detector) used in an experiment.

As shown in FIG. 22, an experiment was carried out such that, while the distance from an end part of the surface of the MR film 7 on the upper gap layer 17 side to a position A where the distance L1, L5 equaled the distance L2, i.e., where the height of the surface of the electrode layer 11 on the upper gap layer 17 side equaled the height of the surface of the MR film 7 on the upper gap layer 17 side, was taken as X, the spread of effective track width upon changing the distance X was investigated. The magnetic detector MD used in the experiment was generally symmetrical about a center line as seen from the air bearing surface.

In the experiment, while the effective track width at the distance X of 200 nm was taken as a reference value 0, the increase/decrease from the reference value was observed at each of distances X of 0 nm, 10 nm, 20 nm, 50 nm, and 100 nm. The distance X of 0 nm indicates that the surface of the electrode layer 11 on the upper gap layer 17 side is always higher than the surface of the MR film 7 on the upper gap layer 17 side.

As shown in FIG. 22, the experimented magnetic detector MD has a configuration in which the electrode layer 11 in the magnetic detector MD in the first embodiment is turned into a single layer. The MR film 7 has a generally trapezoidal form as seen from the air bearing surface. The distance L2 from the reference surface G to the surface of the MR film 7 on the upper gap layer 17 side is set to 35 nm, whereas the distance L1, L5 from the reference surface G to the surface of the electrode layer 11 on the upper gap layer 17 side is set to 30 nm at its narrowest position. The distance L7 from the reference surface G to the surface of the electrode layer 11 on the upper gap layer 17 side in an end part of the magnetic detector MD is set to 150 nm.

Figure 23:
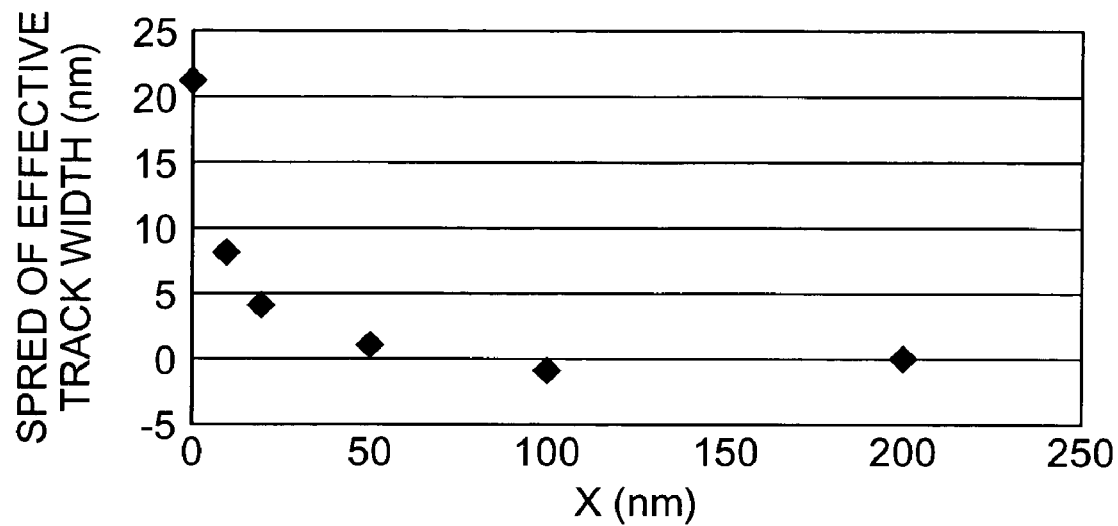

FIG. 23 shows results of the experiment. As can be seen from FIG. 23, an effective track width substantially equal to the effective track width at the distance X of 200 nm is obtained in each of the cases where the distance X is 100 nm and 50 nm. In each of the cases where the distance X is 20 nm, 10 nm, and 0 nm, the effective track width greatly expands from that in the case where the distance X is 200 nm.

The foregoing indicates it preferable to set the distance L1, L5 from the reference surface G to the surface of the electrode layer 11 (first electrode layer 13) on the upper gap layer 17 side shorter than the distance L2 from the reference surface G to the surface of the MR film 7 on the upper gap layer 17 side in an area separated from an end part of the surface of the MR film 7 on the upper gap layer 17 side by 50 nm to 200 nm. When the distance X is greater than 200 nm, a thin part in the electrode layer 11 is formed over a relatively long distance, thus increasing the electric resistance in the electrode layer 11, which is not favorable.

A thin-film magnetic head assembly HGA using the above-mentioned thin-film magnetic head MH1, MH2 will now be explained.

Figure 24:
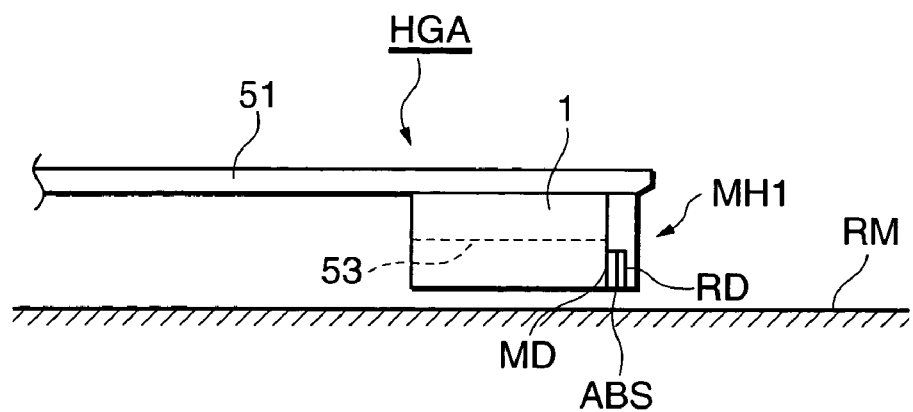
FIG. 24 is a side view of a thin-film magnetic head assembly.

FIG. 24 is a side view of the thin-film magnetic head assembly HGA. The thin-film magnetic head assembly HGA comprises the thin-film magnetic head MH1 in accordance with the first embodiment as its thin-film magnetic head. The thin-film magnetic head MH2 in accordance with the second embodiment may be used in place of the thin-film magnetic head MH1 in accordance with the first embodiment as a matter of course.

The thin-film magnetic head assembly HGA comprises a flexible member 51 in addition to the thin-film magnetic head MH1. The flexible member 51 can flex within a plane including its longitudinal direction and thickness direction. The thin-film magnetic head MH1 is attached to the flexible member 51 such that the laminating direction of the individual layers in the MR film 7 substantially coincides with the longitudinal direction. The thin-film magnetic head MH1 is a functional device employing a nonmagnetic substrate 1 as a slider, whereas the slider 1 has a groove extending in the laminating direction of the individual layers in the MR film 7. The groove 53 defines an aerodynamic characteristic of the thin-film magnetic head MH1 at the time of levitation.

The flexible member 51 having the thin-film magnetic head MH1 attached thereto flexes in the thickness direction depending on the force received by the thin-film magnetic head MH1. The laminating direction of the individual layers (longitudinal direction of the flexible member 51) in the MR film 7 substantially coincides with a track length direction formed by a continuous magnetization transitional area of a recording medium.

A storage device HD using the thin-film magnetic head MH1, MH2 (thin-film magnetic head assembly HGA) will now be explained.

Figure 25:
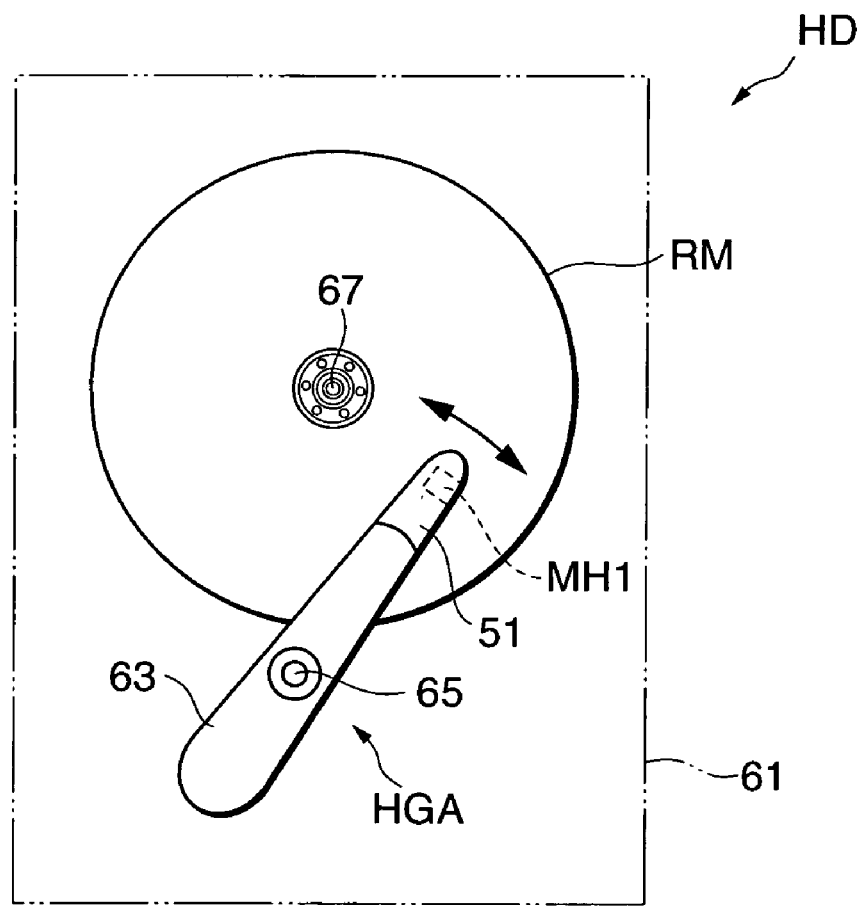
FIG. 25 is a plan view of a storage device using the thin-film magnetic head assembly shown in FIG. 24.

FIG. 25 is a plan view of the storage device HD. This storage device HD comprises a housing 61. In addition to the thin-film magnetic head assembly HGA having the thin-film magnetic head MH1, a magnetic recording medium RM is disposed within the housing 61. The thin-film magnetic head HGA is a head gimbal assembly including an arm 60 to which one longitudinal end part of the flexible member 51 is secured. When the arm 63 rotates about a shaft 65 disposed near its center part, the thin-film magnetic head MH1 moves radially of the magnetic recording medium RM. The magnetic recording medium RM is formed like a disk having tracks each formed by a circular continuous magnetization transitional area. As the magnetic recording medium RM rotates about a shaft 67 disposed at the center of the disk, the magnetization transitional area moves relative to the thin-film magnetic head MH1.

The thin-film magnetic head MH1 (MR film 7) is arranged such that a plane parallel to the laminating direction of the individual layers in the MR film 7 opposes the magnetic recording medium RM. The thin-film magnetic head MH1 (MR film 7) can detect leakage magnetic fields from magnetization transitional areas of the magnetic recording medium RM. A plane parallel to the laminating direction of the individual layers in the MR film 7 is an air bearing surface ABS. Employable as a scheme for recording into the magnetic recording medium RM is longitudinal magnetic recording, perpendicular recording, and the like.

As in the foregoing, each of the thin-film magnetic head assembly HGA and storage device HD comprises any of the thin-film magnetic heads MH1, MH2 in accordance with the first and second embodiments as its thin-film magnetic head, whereby the seepage in reading is further reduced at both end parts of the MR film 7 in the track width direction. As a result, the effective track width can effectively be restrained from expanding, and a very high output stability can be obtained.

The present invention is not limited to the above-mentioned embodiments. For example, it is not necessary for each layer to have a structure made of a single material. Each layer may be made of a plurality of materials as long as it can attain a predetermined function as a whole. For example, the layers may be formed as alloys, mixed components, or a combination of layer structures. Also, these layers may be provided with other layers interposed therebetween.

Though the thin-film magnetic head MH1, MH2 comprises the magnetic detector MD as a read head and the magnetic field forming device RD as a recording head in the above-mentioned embodiments, it may comprise the magnetic detector MD alone.

Though each electrode layer 11 includes the first electrode layer 13 and second electrode layer 15 in the above-mentioned embodiments, it may be made of a single layer as shown in FIG. 22.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A thin-film magnetic head comprising:
  a magnetoresistive film;
  a pair of magnetic domain control layers, disposed separately from each other on both sides of the magnetoresistive film in a track width direction, for applying a bias magnetic field to the magnetoresistive film;
  a pair of electrode layers, laminated on the respective magnetic domain control layers while being separated from each other on both sides of the magnetoresistive film in the track width direction, for supplying a current to the magnetoresistive film;
  first and second shield layers, disposed separately from each other in a laminating direction so as to hold the magnetic domain control layers and electrode layers therebetween, for shielding the magnetoresistive film;
  a first insulating layer disposed between the magnetoresistive film and a magnetic domain control layer of the pair of magnetic domain control layers and the first shield layer; and
  a second insulating layer disposed between the magnetoresistive film and an electrode layer of the pair of electrode layers and the second shield layer;
  wherein the shield layers have a distance therebetween shorter at a position where the electrode layer and the magnetic domain control layer are laminated than that at a position where the magnetoresistive film is located; and wherein, while a surface of the magnetic domain control layer on the first insulating layer side at the position where the electrode layer and the magnetic domain control layer are laminated is taken as a reference surface, a distance from the reference surface to a surface of the electrode layer on the second insulating layer side is set shorter than the distance from the reference surface to a surface of the magnetoresistive film on the second insulating layer side.

2. A thin-film magnetic head according to claim 1, further comprising an additional electrode layer separated from an end part of the magnetoresistive film in the track width direction by at least a predetermined length in the track width direction and electrically connected to the former electrode layer.

3. A thin-film magnetic head according to claim 2, wherein the additional electrode layer has a thickness set greater than that of the former electrode layer.

4. A thin-film magnetic head according to claim 2, further comprising an additional magnetic domain control layer separated from an end part of the magnetoresistive film in the track width direction by at least a predetermined length in the track width direction and laminated on the former magnetic domain control layer.

5. A thin-film magnetic head according to claim 1, wherein the distance from the reference surface to the surface of the electrode layer on the second insulating layer side is set shorter than the distance from the reference surface to the surface of the magnetoresistive film on the second insulating layer side within an area separated by 50 nm to 200 nm from an end part of the surface of the magnetoresistive film on the second insulating layer side in the track width direction.

6. A thin-film magnetic head assembly comprising a thin-film magnetic head, and a flexible member for attaching the thin-film magnetic head thereto;
  the thin-film magnetic head comprising:
  a magnetoresistive film;
  a pair of magnetic domain control layers, disposed separately from each other on both sides of the magnetoresistive film in a track width direction, for applying a bias magnetic field to the magnetoresistive film;
  a pair of electrode layers, laminated on the respective magnetic domain control layers while being separated from each other on both sides of the magnetoresistive film in the track width direction, for supplying a current to the magnetoresistive film;
  first and second shield layers, disposed separately from each other in a laminating direction so as to hold the magnetic domain control layers and electrode layers therebetween, for shielding the magnetoresistive film;

a first insulating layer disposed between the magnetoresistive film and a magnetic domain control layer of the pair of magnetic domain control layers and the first shield layer; and a second insulating layer disposed between the magnetoresistive film and an electrode layer of the pair of electrode layers and the second shield layer;

wherein the shield layers have a distance therebetween shorter at a position where the electrode layer and the magnetic domain control layer are laminated than that at a position where the magnetoresistive film is located; and wherein, while a surface of the magnetic domain control layer on the first insulating layer side at the position where the electrode layer and the magnetic domain control layer are laminated is taken as a reference surface, a distance from the reference surface to a surface of the electrode layer on the second insulating layer side is set shorter than the distance from the reference surface to a surface of the magnetoresistive film on the second insulating layer side.

7. A storage device comprising a magnetic recording medium for magnetically recording a signal, and a thin-film magnetic head for converting a change in a magnetic field leaking from the magnetic recording medium into an electric signal;

the thin-film magnetic head comprising:

a magnetoresistive film;

a pair of magnetic domain control layers, disposed separately from each other on both sides of the magnetoresistive film in a track width direction, for applying a bias magnetic field to the magnetoresistive film;

a pair of electrode layers, laminated on the respective magnetic domain control layers while being separated from each other on both sides of the magnetoresistive film in the track width direction, for supplying a current to the magnetoresistive film;

first and second shield layers, disposed separately from each other in a laminating direction so as to hold the magnetic domain control layers and electrode layers therebetween, for shielding the magnetoresistive film;

a first insulating layer disposed between the magnetoresistive film and a magnetic domain control layer of the pair of magnetic domain control layers and the first shield layer; and a second insulating layer disposed between the magnetoresistive film and an electrode layer of the pair of electrode layers and the second shield layer;

wherein the shield layers have a distance therebetween shorter at a position where the electrode layer and the magnetic domain control layer are laminated than that at a position where the magnetoresistive film is located; and wherein, while a surface of the magnetic domain control layer on the first insulating layer side at the position where the electrode layer and the magnetic domain control layer are laminated is taken as a reference surface, a distance from the reference surface to a surface of the electrode layer on the second insulating layer side is set shorter than the distance from the reference surface to a surface of the magnetoresistive film on the second insulating layer side.

* * * * *